US011100613B2

United States Patent
Li et al.

(10) Patent No.: US 11,100,613 B2
(45) Date of Patent: Aug. 24, 2021

(54) SYSTEMS AND METHODS FOR ENHANCING EDGES IN IMAGES

(71) Applicant: ZHEJIANG DAHUA TECHNOLOGY CO., LTD., Zhejiang (CN)

(72) Inventors: Wei Li, Hangzhou (CN); Junjun Yu, Hangzhou (CN); Wei Fang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 125 days.

(21) Appl. No.: 16/503,733

(22) Filed: Jul. 5, 2019

(65) Prior Publication Data

US 2019/0333192 A1 Oct. 31, 2019

Related U.S. Application Data

(63) Continuation of application No. PCT/CN2017/118936, filed on Dec. 27, 2017.

(30) Foreign Application Priority Data

Jan. 5, 2017 (CN) .......................... 201710007860.1

(51) Int. Cl.
*G06T 5/00* (2006.01)
*G06T 5/20* (2006.01)
(Continued)

(52) U.S. Cl.
CPC .............. *G06T 5/002* (2013.01); *G06T 5/003* (2013.01); *G06T 5/20* (2013.01); *G06T 7/13* (2017.01);
(Continued)

(58) Field of Classification Search
None
See application file for complete search history.

(56) References Cited

U.S. PATENT DOCUMENTS 7,248,745 B1 * 7/2007 Georgiev ................ G06T 5/008
358/3.26
9,633,416 B1 * 4/2017 Lee .......................... G06T 5/002
(Continued)

FOREIGN PATENT DOCUMENTS

| CN | 1744665 A | 3/2006 |
|---|---|---|
| CN | 100362850 C | 1/2008 |

(Continued)

OTHER PUBLICATIONS

International Search Report in PCT/CN2017/118936 dated Feb. 24, 2018, 4 pages.

(Continued)

*Primary Examiner* — Kim Y Vu
*Assistant Examiner* — Nathan J Bloom
(74) *Attorney, Agent, or Firm* — Metis IP LLC

(57) ABSTRACT

A method configured to be implemented on at least one image processing device for enhancing edges in images includes obtaining, by the at least one imaging processing device, image data of an image, wherein the image includes a plurality of pixels, and each of the plurality of pixels has a luminance value and a motion intensity value. The method also includes performing at least one filtering operation to the image to obtain, by the at least one imaging processing device, one or more filtered values for each pixel. The method further includes performing a first logical operation to the one or more filtered values of each pixel in the image to obtain, by the at least one imaging processing device, an edge value and an edge enhancement coefficient for each pixel in the image. The method still further includes performing a second logical operation to the luminance value (Continued)

and the motion value of each pixel to obtain, by the at least one imaging processing device, an enhancement adjusting coefficient for each pixel in the image, wherein the enhancement adjusting coefficient is associated with the edge enhancement coefficient. The method still further includes adjusting, by the at least one imaging processing device, the luminance value of each pixel based on at least one of the type, the edge enhancement coefficient, and the enhancement adjusting coefficient of each pixel.

16 Claims, 14 Drawing Sheets

(51) Int. Cl.
*G06T 7/13* (2017.01)
*G06T 7/20* (2017.01)

(52) U.S. Cl.
CPC ...... *G06T 7/20* (2013.01); *G06T 2207/20192* (2013.01); *G06T 2207/20201* (2013.01)

(56) References Cited

U.S. PATENT DOCUMENTS

| | | |
|---|---|---|
| 2005/0157189 A1 | 7/2005 | Sambongi |
| 2006/0251170 A1 | 11/2006 | Ali |
| 2007/0047647 A1 | 3/2007 | Lee et al. |
| 2007/0201759 A1 | 8/2007 | Lee et al. |
| 2008/0085061 A1* | 4/2008 | Arici ...................... H04N 19/86 382/268 |
| 2009/0161756 A1* | 6/2009 | Lin ........................ H04N 19/85 375/240.02 |
| 2010/0290716 A1* | 11/2010 | Mori ....................... G06T 5/002 382/309 |
| 2011/0142363 A1* | 6/2011 | Nojima .................... G06T 7/13 382/260 |
| 2012/0081553 A1* | 4/2012 | Cote ....................... G06T 5/002 348/207.1 |
| 2012/0251012 A1* | 10/2012 | Ikai ........................ H04N 19/44 382/232 |
| 2013/0083246 A1* | 4/2013 | Chen ....................... G06T 5/002 348/620 |
| 2014/0023268 A1 | 1/2014 | Tamura |
| 2014/0072218 A1 | 3/2014 | Kim et al. |
| 2015/0125090 A1* | 5/2015 | Mizobuchi ................ G06T 5/20 382/266 |
| 2015/0228085 A1* | 8/2015 | Komiya ............. H04N 5/23267 382/107 |
| 2016/0042500 A1 | 2/2016 | Engberg et al. |
| 2016/0093027 A1* | 3/2016 | Okamoto ................ G06T 5/003 382/162 |
| 2018/0213251 A1* | 7/2018 | Ikonin .................... H04N 19/44 |
| 2018/0220162 A1* | 8/2018 | Sychev ................ H04N 19/117 |
| 2019/0333192 A1 | 10/2019 | Li et al. |

FOREIGN PATENT DOCUMENTS

| | | |
|---|---|---|
| CN | 10119448 A | 2/2008 |
| CN | 101119448 A | 2/2008 |
| CN | 101272488 A | 9/2008 |
| CN | 101655973 A | 2/2010 |
| CN | 101710415 A | 5/2010 |
| CN | 101710415 A1 | 5/2010 |
| CN | 101976444 A | 2/2011 |
| CN | 101980521 A | 2/2011 |
| CN | 104637030 A | 5/2015 |
| CN | 105096280 A | 11/2015 |
| WO | 2018126962 A1 | 7/2018 |

OTHER PUBLICATIONS

Written Opinion in PCT/CN2017/118936 dated Feb. 24, 2018, 6 pages.
First Office Action in Chinese Application No. 201710007860.1 dated Mar. 7, 2019, 21 pages.
International Search Report in PCT/CN2017/118936 mailed on Feb. 24, 2018, 4 pages.
First Office Actionin Chinese application No. 201710007860.1 dated Mar. 7, 2019, 22 pages.
The Extended European Search Report in European Application No. 17889779.9 dated Oct. 31, 2019, 8 pages.
Djemel Zou et al., A Multi-scale Edge Detector, Pattern Recognition, 26(9):1305-1314, 1993.

* cited by examiner

SYSTEMS AND METHODS FOR ENHANCING EDGES IN IMAGES

CROSS-REFERENCE TO RELATED APPLICATIONS

This application is a Continuation of International Application No. PCT/CN2017/118936, filed on Dec. 27, 2017, which claims priority of Chinese Patent Application No. 201710007860.1, filed on Jan. 5, 2017, the contents of which are incorporated herein by reference.

TECHNICAL FIELD

This disclosure generally relates to image enhancement, and more particularly, relates to systems and methods for enhancing edges in images.

BACKGROUND

Edge enhancement may be a process for transforming an image from one form into another to facilitate subsequent analyses or processing by a person or a machine. Edge enhancement may improve visual effects of an image, emphasize overall or local characteristics of an image in a certain application scenario, make an unclear image become clear, or emphasize some characteristics of interest, enlarge a difference between characteristics of different object in an image, and suppress uninterested characteristics, so as to improve image quality, enrich information, enhance effects of image discrimination and recognition, and satisfy demands of special analyses. Information about edges in an image may belong to high frequency information, and information about flat areas may belong to low frequency information. And most energies in an image may concentrate in low frequency areas, however, edges may be high frequency areas. Thus, traditional edge enhancement usually uses this principle to enhance edges in images. For example, a traditional edge enhancement method may include using a filter to obtain high frequency information from an image, and superposing the high frequency information onto the image.

There may be various types of image edge enhancement methods. For example, a general edge enhancement method may include performing low-pass filtering on an image, obtaining high frequency information by subtracting a low-pass result from the image, and superposing the high frequency information onto the image to obtain an enhanced image. Such edge enhancement method may not distinguish small-sized edges from large-sized edges, and may perform a global enhancement on the image with no difference, thus leading to a relatively obvious crispening effect, and another side effect may be that noise may increase in order to preserve details. In addition, in an alternative method, a set of thresholds may be introduced to determine whether an area corresponding to high frequency information includes small-sized edges, middle-sized edges, large-sized edges or noise. Different edges may be enhanced in different intensities according to actual requirements. This method may make transitions between an enhanced area and an unenhanced area rough and slightly unnatural.

Although various image processing methods may be present, these methods may not be comprehensive for edge enhancement. Small-sized edges, middle-sized edges, large-sized edges, and noise may not be correctly distinguished or processed, respectively, by most of these methods. Therefore, noise in enhanced images may be increased. It may be desirable to develop an improved method for enhancing edges in images.

SUMMARY

In an aspect of the present disclosure, an imaging processing system configured to enhance edges in images is provided. The system may include an image processing. The imaging processing unit may include a bus, at least one storage medium and logic circuits. The at least one storage may be connected to the bus, including a set of instructions for image edge enhancement. The logic circuits may be in communication with the at least one storage medium via the bus. When executing the set of instructions, the logic circuits may perform one or more of the following operations. The logic circuits may obtain first electronic signals including image data of an image. The image may include a plurality of pixels, and each of the plurality of pixels may have a luminance value and a motion intensity value. The logic circuits may perform at least one filtering operation to the image to obtain one or more filtered values for each pixel. The logic circuits may perform a first logical operation to the one or more filtered values of each pixel in the image to obtain an edge value and an edge enhancement coefficient for each pixel in the image. The logic circuits may perform a second logical operation to the luminance value and the motion value of each pixel to obtain an enhancement adjusting coefficient for each pixel in the image. The enhancement adjusting coefficient may be associated with the edge enhancement coefficient. The logic circuits may adjust the luminance value of each pixel based on the edge value, the edge enhancement coefficient, and the enhancement adjusting coefficient of each pixel.

In some embodiments, the system may include at least one lens and at least one sensor. The at least one lens may be configured to intake a scene. The at least one sensor may be in communication with the logic circuits, configured to detect the scene from the at least one lens and transform the scene into the first electronic signal.

In some embodiments, the motion intensity value may be a degree of the change of a pixel caused by motion. The logic circuits may further determine a motion status of the pixel based on the motion intensity value.

In some embodiments, the logic circuits may duplicate or mirror pixels at one or more borders of the image to generate an extended image.

In some embodiments, to perform the at least one filtering operation, the logic circuits may perform one or more of the following operations. The logic circuits may filter image data of the extended image using a low-pass filter to generate a low-pass value for each pixel of the image. For each pixel of the image, the logic circuits may subtract the low-pass value from the image data to generate a first high-pass value. The logic circuits may filter the image data of the extended image using a high-pass filter to generate a second high-pass value for each pixel of the image.

In some embodiments, to perform the first logical operation to determine the edge value for each pixel in the image, the logic circuits may perform one or more of the following operations. The logic circuits may compare the first high-pass value of a pixel with at least one of a first threshold, a second threshold, or a third threshold. In response to a determination that the first high-pass value is larger than the first threshold and smaller than the second threshold, the logic circuits may assign the first high-pass value to the edge value of the pixel. In response to the determination that the first high-pass value is larger than the second threshold value, the logic circuits may assign the second high-pass value to the edge value of the pixel.

In some embodiments, to perform the first logical operation to obtain the edge enhancement coefficient for each pixel in the image, the logic circuits may perform one or more of the following operations. The logic circuits may obtain second electronic signals including a first mapping relationship between edge enhancement coefficients and first high-pass values. The logic circuits may determine the edge enhancement coefficient for each pixel based on the first high-pass value for each pixel and the first mapping relationship.

In some embodiments, to perform the second logical operation to obtain the enhancement adjusting coefficient for each pixel in the image, the logic circuits may determine a luminance enhancement adjusting coefficient for each pixel based on the luminance value of each pixel. The logic circuits may determine a motion enhancement adjusting coefficient for each pixel based on the motion status of each pixel. The logic circuits may determine the enhancement adjusting coefficient for each pixel based on the luminance enhancement adjusting coefficient and motion enhancement adjusting coefficient for each pixel.

In some embodiments, to determine the luminance enhancement adjusting coefficient for each pixel based on the luminance value of each pixel, the logic circuits may obtain third electronic signals including a second mapping relationship between luminance enhancement adjusting coefficients and luminance values. The logic circuits may determine the luminance enhancement adjusting coefficient for each pixel based on the luminance value of each pixel and the second mapping relationship.

In some embodiments, to determine the motion enhancement adjusting coefficient for each pixel based on the motion status of each pixel, the logic circuits may perform one or more of the following operations. The logic circuits may obtain fourth electronic signals including a third mapping relationship between motion enhancement adjusting coefficients and motion statuses. The logic circuits may determine the motion enhancement adjusting coefficient for each pixel based on the motion status of each pixel and the third mapping relationship.

In some embodiments, the logic circuits may further compare the first high-pass value of a pixel with at least one of a first threshold, a second threshold, or a third threshold. The logic circuits may adjust the luminance enhancement adjusting coefficient for each pixel based on the luminance value and a comparison result of each pixel.

In some embodiments, the logic circuits may further detect dead pixels from the plurality of pixels in the image. The logic circuits may calibrate the detected dead pixels.

In another aspect of the present disclosure, a method configured to be implemented on at least one image processing device to enhance edges in images is provided. The method may comprise one or more of the following operations. The method may include one or more of the following operations. Image data may be obtained. The image data may include a plurality of pixels, and each of the plurality of pixels may have a luminance value and a motion intensity value. At least one filtering operation may be performed to the image to obtain one or more filtered values for each pixel by the at least one imaging processing device. A first logical operation may be performed to the one or more filtered values of each pixel in the image to obtain an edge value and an edge enhancement coefficient for each pixel in the image by the at least one imaging processing device. A second logical operation may be performed to the luminance value and the motion value of each pixel to obtain, an enhancement adjusting coefficient for each pixel in the image by the at least one imaging processing device. The enhancement adjusting coefficient may be associated with the edge enhancement coefficient. The luminance value of each pixel may be adjusted, by the at least one imaging processing device, based on at least one of the type, the edge enhancement coefficient, and the enhancement adjusting coefficient of each pixel.

In some embodiments, the method may comprise intaking a scene by at least one lens. The scene may be detected from the at least one lens. The scene may be transformed into the first electronic signal.

In some embodiments, the motion intensity value may be a degree of the change of a pixel caused by motion. A motion status of the pixel may be determined based on the motion intensity value.

In some embodiments, the method may further comprise duplicating or mirroring pixels at one or more borders of the image to generate an extended image.

In some embodiments, to perform the at least one filtering operation, the method may further comprise one or more of the following operations. Image data of the extended image may be filtered using a low-pass filter to generate a low-pass value for each pixel of the image. For each pixel of the image, the low-pass value may be subtracted from the image data to generate a first high-pass value. The image data of the extended image may be filtered using a high-pass filter to generate a second high-pass value for each pixel of the image.

In some embodiments, to perform the first logical operation to determine the edge value for each pixel in the image, the method may further comprise one or more of the following operations. The first high-pass value of a pixel may be compared with at least one of a first threshold, a second threshold, or a third threshold. In response to a determination that the first high-pass value is larger than the first threshold and smaller than the second threshold, the first high-pass value may be assigned to the edge value of the pixel. In response to the determination that the first high-pass value is larger than the second threshold value, the second high-pass value may be assigned to the edge value of the pixel.

In some embodiments, to perform the first logical operation to obtain the edge enhancement coefficient for each pixel in the image, the method may further comprising obtaining second electronic signals. The second signals may include a first mapping relationship between edge enhancement coefficients and first high-pass values. The edge enhancement coefficient may be determined for each pixel based on the first high-pass value for each pixel and the first mapping relationship.

In some embodiments, to perform the second logical operation to obtain the enhancement adjusting coefficient for each pixel in the image, the method may further comprise one or more following operations. A luminance enhancement adjusting coefficient may be determined for each pixel based on the luminance value of each pixel. A motion enhancement adjusting coefficient may be determined for each pixel based on the motion status of each pixel. The enhancement adjusting coefficient may be determined for each pixel based on the luminance enhancement adjusting coefficient and motion enhancement adjusting coefficient for each pixel.

In some embodiments, to determine the luminance enhancement adjusting coefficient for each pixel based on the luminance value of each pixel, the method may further comprise obtaining third electronic signals including a second mapping relationship between luminance enhancement adjusting coefficients and luminance values. The luminance enhancement adjusting coefficient may be determined for each pixel based on the luminance value of each pixel and the second mapping relationship.

In some embodiments, to determine the motion enhancement adjusting coefficient for each pixel based on the motion status of each pixel, the method may comprise obtaining fourth electronic signals including a third mapping relationship between motion enhancement adjusting coefficients and motion statuses. The motion enhancement adjusting coefficient may be determined for each pixel based on the motion status of each pixel and the third mapping relationship.

In some embodiments, the method may further comprise comparing the first high-pass value of a pixel with at least one of a first threshold, a second threshold, or a third threshold. The luminance enhancement adjusting coefficient may be adjusted for each pixel based on the luminance value and a comparison result of each pixel.

In some embodiments, the method may further comprise detecting dead pixels from the plurality of pixels in the image, and calibrating the detected dead pixels.

In yet another aspect of the present disclosure, a non-transitory medium is provided. The non-transitory medium may store instructions. When executed by at least one image processing device, the instructions may cause the at least one image processing device to implement a method. The method may comprise one or more of the following operations. Image data may be obtained. The image data may include a plurality of pixels, and each of the plurality of pixels may have a luminance value and a motion intensity value. At least one filtering operation may be performed to the image to obtain one or more filtered values for each pixel by the at least one imaging processing device. A first logical operation may be performed to the one or more filtered values of each pixel in the image to obtain an edge value and an edge enhancement coefficient for each pixel in the image by the at least one imaging processing device. A second logical operation may be performed to the luminance value and the motion value of each pixel to obtain, an enhancement adjusting coefficient for each pixel in the image by the at least one imaging processing device. The enhancement adjusting coefficient may be associated with the edge enhancement coefficient. The luminance value of each pixel may be adjusted, by the at least one imaging processing device, based on at least one of the type, the edge enhancement coefficient, and the enhancement adjusting coefficient of each pixel.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
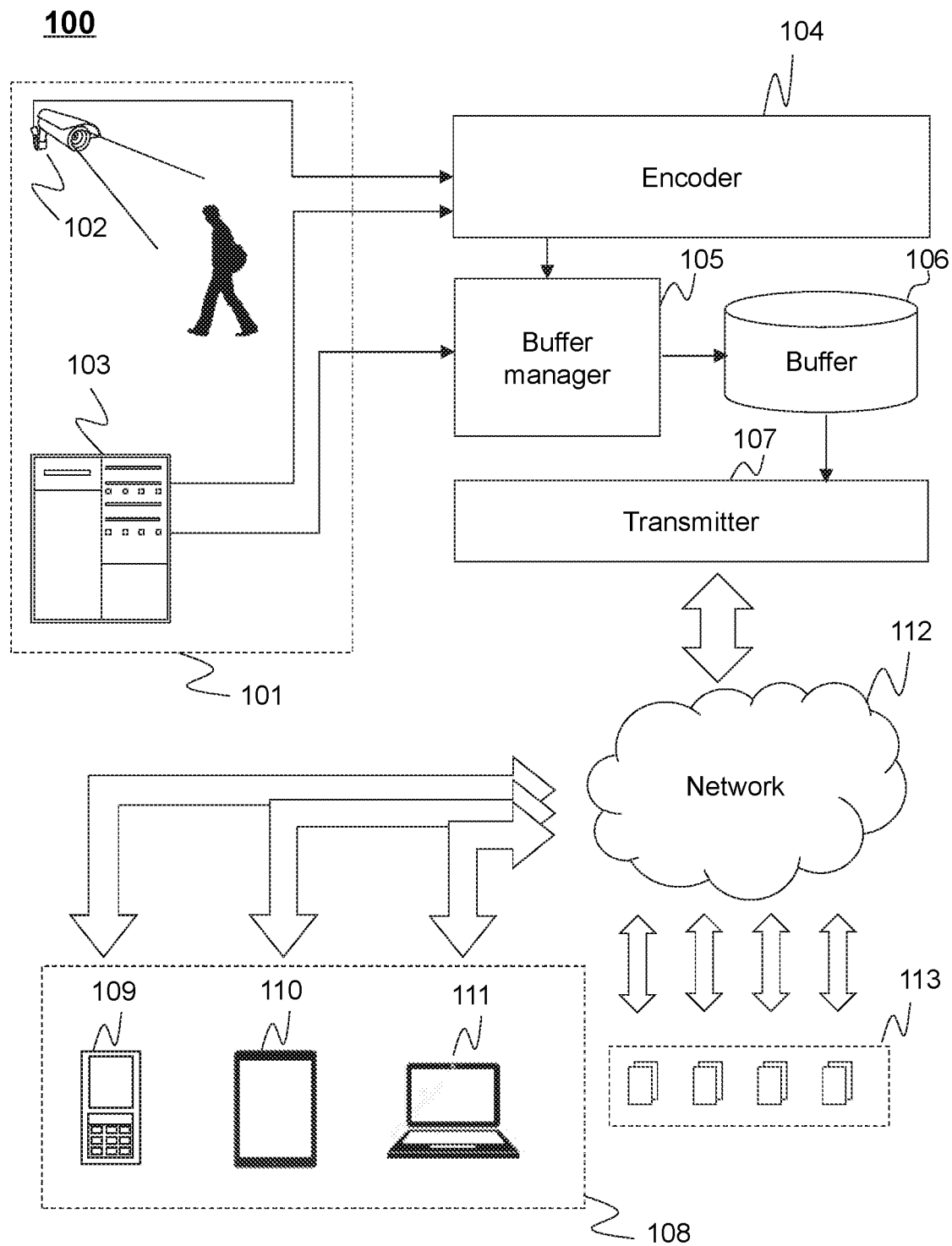
FIG. 1 is a schematic diagram illustrating an exemplary image processing system according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

As used in the disclosure and the appended claims, the singular forms "a," "an," and "the" include plural referents unless the content clearly dictates otherwise. It will be further understood that the terms "comprises," "comprising," "includes," and/or "including" when used in the disclosure, specify the presence of stated steps and elements, but do not preclude the presence or addition of one or more other steps and elements.

Some modules of the system may be referred to in various ways according to some embodiments of the present disclosure, however, any number of different modules may be used and operated in a client terminal and/or a server. These modules are intended to be illustrative, not intended to limit the scope of the present disclosure. Different modules may be used in different aspects of the system and method.

According to some embodiments of the present disclosure, flow charts are used to illustrate the operations performed by the system. It is to be expressly understood, the operations above or below may or may not be implemented in order. Conversely, the operations may be performed in inverted order, or simultaneously. Besides, one or more other operations may be added to the flowcharts, or one or more operations may be omitted from the flowchart.

Technical solutions of the embodiments of the present disclosure be described with reference to the drawings as described below. It is obvious that the described embodiments are not exhaustive and are not limiting. Other embodiments obtained, based on the embodiments set forth in the present disclosure, by those with ordinary skill in the art without any creative works are within the scope of the present disclosure.

In an aspect, the present disclosure is directed to systems and methods for enhancing edges in images. Edges in an image may be enhanced by processing pixels thereof in consideration of one or more factors, for example, an edge type, a luminance value, and a motion status. Thus, different edges may be enhanced with different intensities.

FIG. 1 is a schematic diagram illustrating an exemplary image processing system according to some embodiments of the present disclosure. The image processing system 100 may be configured to process an image or a video composed of a plurality of images (also referred to as "video frames"). As shown, the image processing system 100 may include a video source 101, an encoder 104, a buffer manager 105, a buffer 106, a transmitter 107, a terminal 108 (or a plurality of terminals 108), network 112, and a network storage device 113 (or a plurality of network storages 113).

The video source 101 may provide a video through the network 112 to a user of a terminal 108. The video source 101 may generate a video itself or via a video transfer site. For example, the video source 101 may include a camera 102 and/or a media server 103.

The camera 102 may be able to capture one or more images. As used in this application, an image may be a still image, a video, a stream video, or a video frame obtained from a video. The image may be a three-dimensional (3D) image or a two-dimensional (2D) image. In some embodiments, the camera 102 may be a digital camera, a video camera, a security camera, a web camera, a smartphone, a tablet, a laptop, a video gaming console equipped with a web camera, a camera with multiple lenses, etc.

The camera 102 may include a lens, a shutter, a sensor, a processing device, and a storage device. The lens may be an optical device that focuses a light beam by means of refraction to form an image. In some embodiments, the lens may include one or more lenses. The lens may be configured to intake a scene. An aperture of the lens may refer to the size of the hole through which light passes to reach the sensor. The aperture may be adjustable to adjust the amount of light that passes through the lens. The focal length of the lens may be adjustable to adjust the coverage of the camera 102.

The shutter may be opened to allow light through the lens when an image is captured. The shutter may be controlled manually or automatically by the processing device.

The sensor may be configured to receive light passing through the lens and transform the light signals of the received light into electrical signals. The sensor may include charge coupled device (CCD) and complementary metal-oxide semiconductor (CMOS). The sensor may be in communication with the logic circuits, and may be configured to detect the scene from the lens and transform the scene into electronic signals.

The processing device may be configured to process data and/or information relating to the camera 102 in the present disclosure and/or control one or more components (e.g., the lens, the shutter) in the camera 102. For example, the processing device may automatically determine target values of exposure parameters of the camera 102 such as an exposure time, an exposure gain, and an aperture. The processing device may also adjust quality images taken the camera 102, such as sharpness of the images.

In some embodiments, the processing device may be local or remote. For example, the processing device may communicate with the camera 102 via a network. As another example, the processing device may be integrated into the camera 102.

The storage device may store data, instructions, and/or any other information. In some embodiments, the storage device may store data obtained from the processing device. For example, the storage device may store captured images. In some embodiments, the storage device may store data and/or instructions that the processing device may execute or use to perform exemplary methods described in the present disclosure. In some embodiments, the storage device may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc.

The media sever 103 may be a server (e.g., a computer or a group of computers) for storing, broadcasting, selling, renting, or providing videos. The media server may also include an image and/or video processing electronic device (not shown) configured to process the images and/or video streams from the video source 101 using the methods introduced in the present disclosure.

A "video" provided by the video source 101 may be an electronic medium (e.g., a data file, a bit stream, a series of signal) for the recording, copying, playback, broadcasting, and display of moving visual media, such as a TV program, an animation, a movie, a surveillance or monitoring video, a video shared through a social platform, an advertisement, a live show, a video call, a video conference, or the like, or a combination thereof. A video may include a plurality of frames, which may also be referred to as video frames. A frame may be one of a plurality of still images that compose a completer video. By sequentially displaying frames (e.g., images) of a video in a rate (frame rate), a video player installed on the terminal 108 may present the video to a user.

Before transmitting a video through the network 112, the video source 101 may send the video to the encoder 104 for encoding the video, or send the video to the buffer 106 through the buffer manager 105. For example, the video provided by the video source 101 may be relatively large in size (e.g., raw video data, video encoded with low compression rate), thus before the transmission the video source 101 may send the video to the encoder 104 for video compression. As another example, the video provided by the video source 101 may be proper in size, and the video source 101 may directly send the video to the buffer 106 through the buffer manager 105 for video transmission.

An encoder 104 may be a remote device from the video source 101 or a local device interpreted in the video source 101. It may encode the video provided by the video source 101 before the video is transmitted through the network 112. Through encoding, the video to be transmitted may be compressed and/or encrypted. For example, the encoder 104 may encode a video using an algorithm for video compression so that the cost (e.g., time cost, resource cost, financial cost) for transmitting the video may be significantly reduced. Alternatively or additionally, the encoder 104 may encode a video using an algorithm for video encryption so that the video may be transmitted safely and a user without permission may not watch the video. The encoder 104 may encode the video frame by frame and generate a plurality of encoded video frames. The encoder 104 may send the encoded video frame to the buffer 106 through the buffer manager 105. Alternatively or additionally, the buffer manager 105 may obtain the encoded video frame from the encoder 104.

In some embodiments, the encoder 104 may encode the video to be transmitted using a Moving Picture Experts Group (MPEG) based encoding technique.

The video frames and/or images to be transmitted may be stored in the buffer 106 in a form of a video frame buffering queue, which may be managed by the buffer manager 105. The buffer 106 may use a queue based data structure for buffering the video to be transmitted.

The buffer 106 may be a storage device for buffering the video to be transmitted through the network 112. It may be a remote device from the video source 101 or a local device interpreted in the video source 101, such as the storage medium of the camera. The buffer 106 may include a mass storage device, a removable storage device, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM), such as a dynamic RAM (DRAM), a double date rate synchronous dynamic RAM (DDR SDRAM), a static RAM (SRAM), a thyristor RAM (T-RAM), and a zero-capacitor RAM (Z-RAM). Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc.

The transmitter 107 may transmit the video or video frames buffered in the buffer 106 to the network 112. The transmitter 107 may transmit video or video frames in response to instructions sent from the video provider 101, the buffer manager 105, the terminal 108, or the like, or a combination thereof. Alternatively or additionally, the transmitter 107 may spontaneously transmit video or video frames stored in the buffer 106. The transmitter 107 may transmit video or video frames through the network 112 to the terminal 108 though one or more network connections (wired and/or wireless).

In some embodiments, the transmitter 107 may be capable of determine the transmission performance of the network 112. For example, the transmitter 107 may monitor its data transmitted rate for determining the transmission performance.

The terminal 108 may receive the transmitted video through the network 112. The terminal 108 may decode (e.g., through a video player installed on the terminal 108) the transmitted video or video frames using a decoding algorithm and display the video to a user. The decoding algorithm may correspond to the encoding algorithm used by the encoder 104.

The terminal 108 may be various in forms. For example, the terminal 108 may include a mobile device 109, a tablet computer 110, a laptop computer 111, or the like, or any combination thereof. In some embodiments, the mobile device 109 may include a wearable device, a mobile device, a virtual reality device, an augmented reality device, or the like, or any combination thereof. In some embodiments, the wearable device may include a bracelet, footgear, eyeglasses, a helmet, a watch, clothing, a backpack, a smart accessory, or the like, or any combination thereof. In some embodiments, the mobile device may include a mobile phone, a personal digital assistance (PDA), a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc. In some embodiments, the terminal(s) 108 may be part of a processing engine.

The network 112 may include any suitable network that can facilitate a transmission of a video provided by the video source 101 to the terminal(s) 108. The network 112 may be and/or include a public network (e.g., the Internet), a private network (e.g., a local area network (LAN), a wide area network (WAN)), a wired network (e.g., an Ethernet network), a wireless network (e.g., an 802.11 network, a Wi-Fi network), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 112 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 112 may include one or more network access points. For example, the network 112 may include wired and/or wireless network access points such as base stations and/or internet exchange points through which a video provided by the video source 101 may be transmitted to the terminal 108.

In some embodiments, the network 112 may include one or more network storage devices 113. The network storage device 113 may be a device for buffering or caching data transmitted in the network 112. The video or video frame transmitted by the transmitter 107 may be buffered or cashed in one or more network storage devices 113 before being received by the terminal 108. The network storage device 113 may be a server, a hub, a gateway, or the like, or a combination thereof.

It may be noted that, one or more of the encoder 104, buffer manager 105, buffer 106 and transmitter may be a stand-alone device, or a module integrated into the video source 101 or another stand-alone device. For example, one or more of the encoder 104, buffer manager 105, buffer 106 and transmitter 107 may be integrated into the camera 102 or the media server 103. As another example, the encoder 104, buffer manager 105, buffer 106 and transmitter 107 may be included in a video processing engine which may communicate with the video source 101 through direct wired connection, the network 112, or another network not shown in FIG. 3A. As a further example, the encoder 104 may be a stand-alone device (e.g., a computer or a server), while the buffer manager 105, buffer 106 and transmitter 107 may be included in another stand-alone device.

Figure 2:
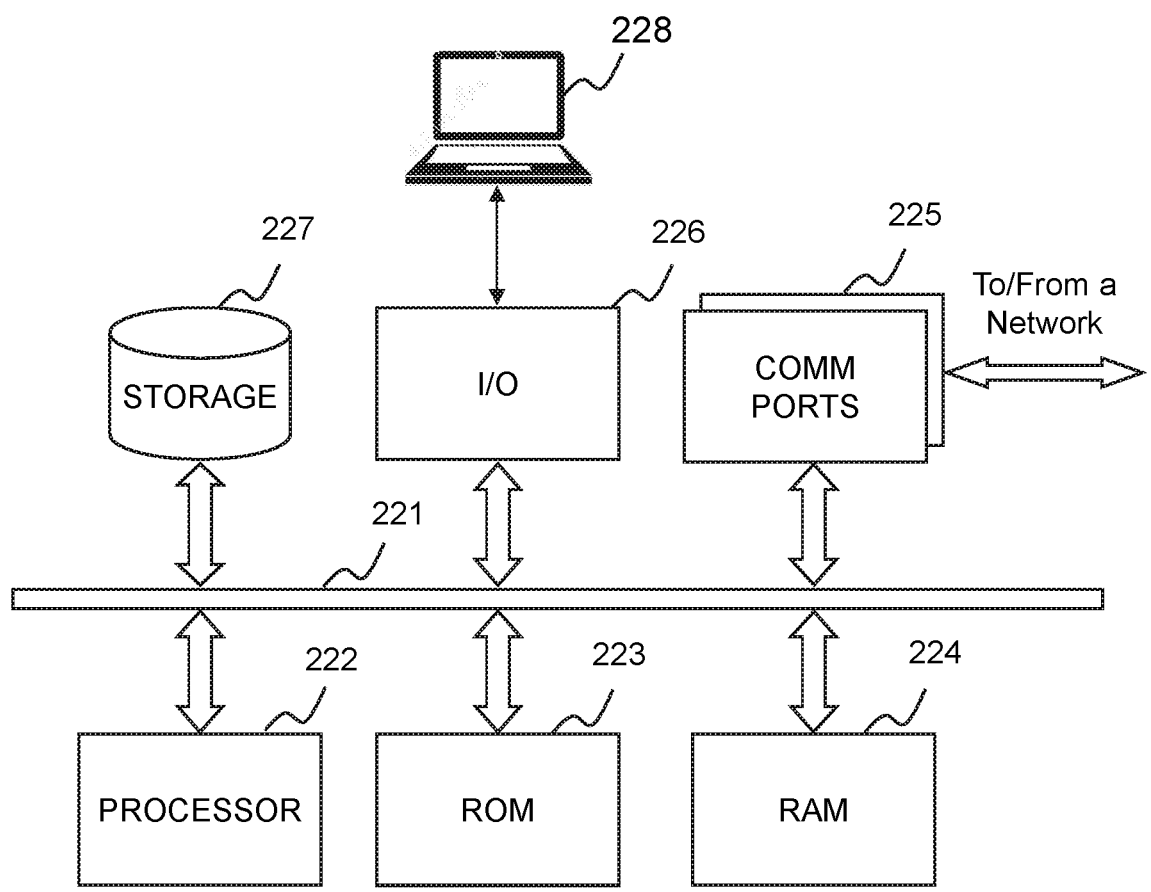
FIG. 2 is a schematic diagram illustrating exemplary components of an exemplary computing device according to some embodiments of the present disclosure.

FIG. 2 is a schematic diagram illustrating exemplary hardware and/or software components of an exemplary computing device according to some embodiments of the present disclosure. For example, the computing device 200 may be the server 103, the processing device of the camera 102, and/or an electronic device specialized in video or image processing. The encoder 104 and buffer manager 105 may also be implemented on the computing device 200. As illustrated in FIG. 2, the computing device 200 may include a processor 222, a storage 227, an input/output (I/O) 226, and a communication port 225.

The processor 222 (e.g., logic circuits) may execute computer instructions (e.g., program code) and perform functions in accordance with techniques described herein. For example, the processor 222 may include interface circuits and processing circuits therein. The interface circuits may be configured to receive electronic signals from a bus (not shown in FIG. 2), wherein the electronic signals encode structured data and/or instructions for the processing circuits to process. The processing circuits may conduct logical operations calculations, and then determine a conclusion, a result, and/or an instruction encoded as electronic signals. Then the interface circuits may send out the electronic signals from the processing circuits via the bus.

The computer instructions may include, for example, routines, programs, objects, components, data structures, procedures, modules, and functions, which perform particular functions described herein. In some embodiments, the processor 222 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both step A and step B, it should be understood that step A and step B may also be performed by two or more different processors jointly or separately in the computing device 200 (e.g., a first processor executes step A and a second processor executes step B, or the first and second processors jointly execute steps A and B).

The storage 227 may store data/information obtained from the video source 101, the encoder 104, the buffer manager 105, the buffer 106, the transmitter 107, the terminal 108, the network 112, the network storage device 113, and/or any other component of the image processing system 100. In some embodiments, the storage 222 may include a mass storage, removable storage, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random-access memory (RAM), which may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 222 may store one or more programs and/or instructions to perform exemplary methods described in the present disclosure. For example, the storage 222 may store a program for the processing engine (e.g., the server 103) for determining a regularization item.

The I/O 226 may input and/or output signals, data, information, etc. In some embodiments, the I/O 226 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 225 may be connected to a network (e.g., the network 112) to facilitate data communications. The communication port 225 may establish connections between the video source 101, the encoder 104, the buffer manager 105, the buffer 106, the transmitter 107, the terminal 108, the network 112, the network storage device 113, and/or any other component of the image processing system 100. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G), or the like, or a combination thereof. In some embodiments, the communication port 2400 may be and/or include a standardized communication port, such as RS232, RS485, etc. In some embodiments, the communication port 225 may be a specially designed communication port.

Figure 3:
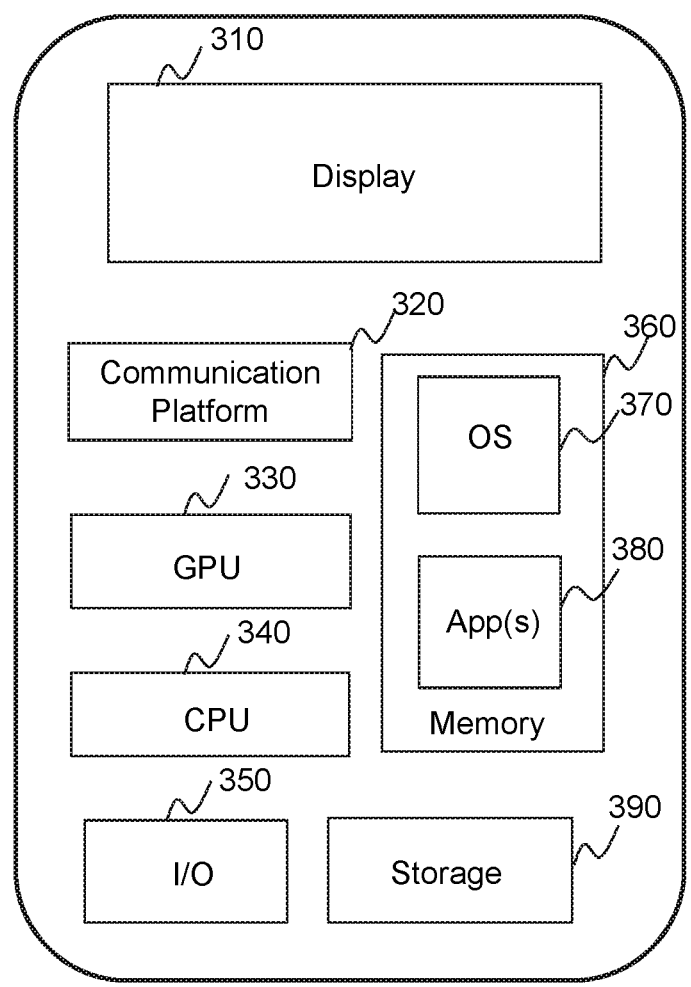
FIG. 3 is a schematic diagram illustrating exemplary components of an exemplary user device according to some embodiments of the present disclosure.

FIG. 3 is a schematic diagram illustrating exemplary components of an exemplary user device according to some embodiments of the present disclosure. As illustrated in FIG. 3, the user device 300 may include a communication platform 320, a display 310, a graphic processing unit (GPU) 330, a central processing unit (CPU) 330, an I/O port 350, a memory 360, and a storage 390. In some embodiments, any other suitable component, including but not limited to a system bus or a controller (not shown), may also be included in the user device 300. In some embodiments, a mobile operating system 370 (e.g., iOS™, Android™, Windows Phone™) and one or more applications 380 may be loaded into the memory 360 from the storage 390 in order to be executed by the processor 340. The user device 300 may be an embodiment of the terminal 108. The applications 380 may include a video player for receiving a video provided by the video source 101 through the network 112 and decode the received video.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
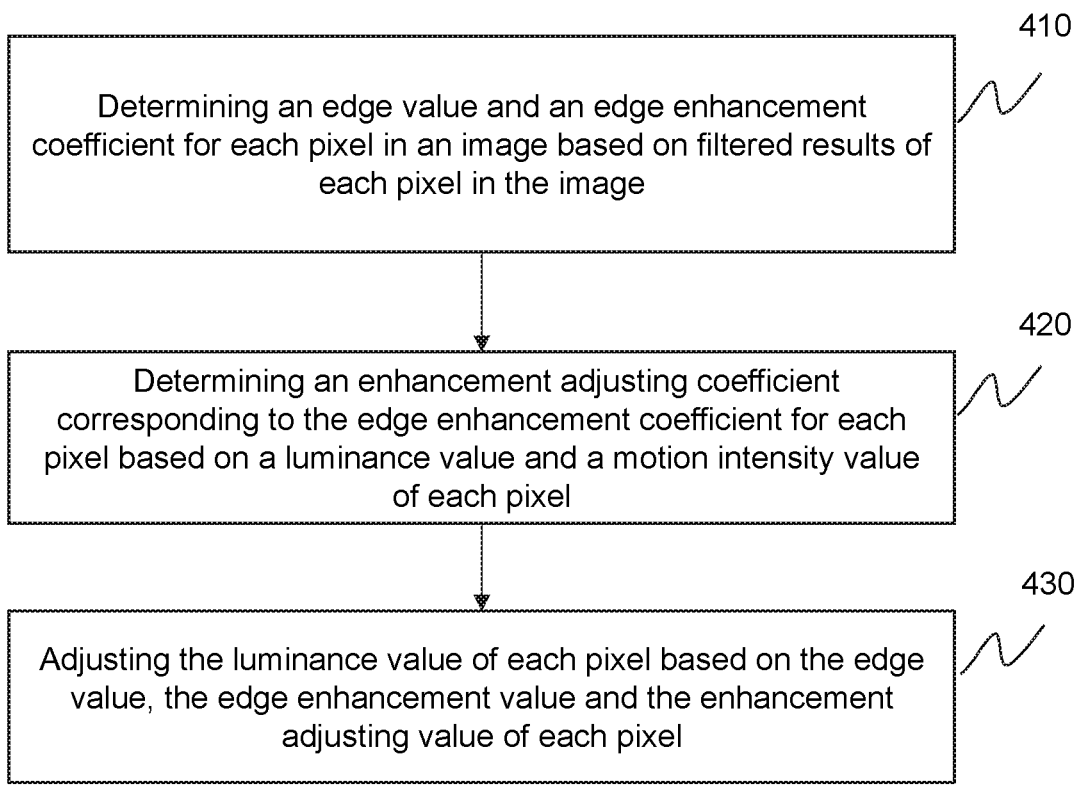
FIG. 4 is a flow chart illustrating an exemplary process for enhancing edges in an image according to some embodiments of the present disclosure.

FIG. 4 is a flow chart illustrating an exemplary process for enhancing edges in an image according to some embodiments of the present disclosure. In some embodiments, the process 400 may be implemented on the image processing system 100 as illustrated in FIG. 1. For example, the process 400 may be stored in a storage medium (e.g., the network storage device 113, or the storage 227 of the computing device 228) as a form of instructions, and invoked and/or executed by the media server 103. The operations in the process 400 presented below are intended to be illustrative. In some embodiments, the process 400 may be accomplished with one or more additional operations not described, and/or without one or more of the operations discussed. Additionally, the order in which the operations of the process 400 as illustrated in FIG. 4 and described below may not be intended to be limiting. As shown in FIG. 4, an embodiment of the present disclosure may provide an image edge enhancement method.

In 410, the processor 222 may obtain an image as electronic signals and perform a filtering operation to the image, and then the processor 222 may determine, based on filtered results of each pixel in the image, an edge value and an edge enhancement coefficient for each pixel in the image.

In 420, the processor 222 may perform logical operations to determine, based on a luminance value and a motion intensity value of each pixel, an enhancement adjusting coefficient corresponding to the edge enhancement coefficient for each pixel.

In 430, the processor 222 may adjust the luminance value of each pixel based on the edge value, the edge enhancement value and the enhancement adjusting value of each pixel.

The image edge enhancement method provided by the embodiment of the present disclosure may be used for determining, based on filtered results (e.g., a high-pass value, a low-pass value, a band-pass value, etc.) of each pixel, an edge value and an edge enhancement coefficient of each pixel, and determining, based on a luminance value and a motion intensity value of each pixel, an enhancement adjustment coefficient to adjust the edge enhancement coefficient. As used herein, a "motion intensity value" may refer to a degree of the change of a pixel caused by motion. The motion intensity value may be used to estimate a motion status of the pixel. Images with edges enhanced according to the image edge enhancement method set forth above may be more suitable for analyzing and/or processing, because the luminance value and motion status of each pixel are taken into account when performing the image edge enhancement.

In a particular embodiment, the image may be image data. The image data may be in a certain format, such as Hue-Saturation-Brightness (HSB), (red, green, blue) RGB, luma and chroma (YUV), etc. In some embodiments, the image data may be in a YUV format, or may be converted into a YUV format. Y may represent luminance or luma, for example, a gray scale value, and U and V may represent chrominance or chroma, which may be used to describe a color and saturation of the image, and specify a color of a pixel. A luminance signal Y and chrominance signals U and V may be separate in the image data of a YUV format. In some embodiments, in image processing, the processor 222 may process the luminance signal Y, and synchronize the chrominance signals U and V to an output port through a bypass. It should be noted that the image processing system 100, more specifically, the media server 103 may perform an edge enhancement on an image or a video. The media server 103 may process the video frame-by-frame according to the image edge enhancement method provided by some embodiments of the present disclosure.

In some embodiments, the media server 103 may determine the filtered results in 410 by performing filtering operations on one or more pixels in the image. The filtering operations may include a high-pass filtering, a low-pass filtering, a band-pass filtering, or the like, or a combination thereof. In some embodiments, the media server 103 may perform a low-pass filtering on each pixel in the input image data to obtain a low-pass filtered result, respectively. The media server 103 may determine a first high-pass value may be determined by using the original image data to subtract the low-pass filtered result. In some embodiments, the media server 103 may perform high-pass filtering on each pixel in the input image data, respectively, to obtain a second high-pass value.

When the media server 103 performs a filtering operation, the processor 202 may construct a data processing window. The media server 103 may scan, using the data processing window, each pixel in the input image data one by one to obtain filtered results of each pixel. In some embodiments, the data processing window may cover a plurality of pixels. For example, a size of data processing window may be set to 3×3, 4×4, or 5×5, and the data processing window may cover 9 pixels (i.e., 3 columns×3 rows), 16 pixels (i.e., 4 columns×4 rows), or 25 pixels (i.e., 5 columns×5 rows), respectively. When the media server 103 performs filtering operations, a pixel at a center of the data processing window may be defined as a central pixel, and other pixels in the data processing window may be reference pixels for the pixel under processing. The central pixel may be currently under processing.

After the media server 103 obtains filtered results of the central pixel and each reference pixel, the media server 103 may determine a filtered value of the central pixel. As used herein, a "filtered result" may be an intermediate result obtained by performing filtering operations on a central pixel and/or one or more reference pixels in the data processing window. A "filtered value" may refer to a value of the central pixel obtained by performing mathematics operations based on a filtered result. Specifically, the media server 103 may determine the filtered value of the central pixel according to a weight of each pixel in the data processing window. In some embodiments, the weight of each pixel may be determined according to a type of a filter used to obtain a filtered result. In some embodiments, a filter may include a mean filter, a median filter, a minimum filter, a maximum filter, a range filter, a ranking filter, an alpha-trimmed mean filter, a minimal mean square error filter, a Gaussian filter, or the like. For example, if the media server 103 uses a mean filter, the filtered value of the central pixel may be an average value of each pixel in the data processing window.

However, when the media server 103 scans pixels at an edge of the image, there are no rows above a first row or under a last row in the input image. Also, there are no columns on a side of a first column or a last column in the input image. For example, when the media server 103 scans a pixel above the first row using the data processing window, one or more reference pixels for the central pixel may be absent. Therefore, in order to ensure an accuracy of the filtered value, the input image may need to be bordered.

Figure 5:
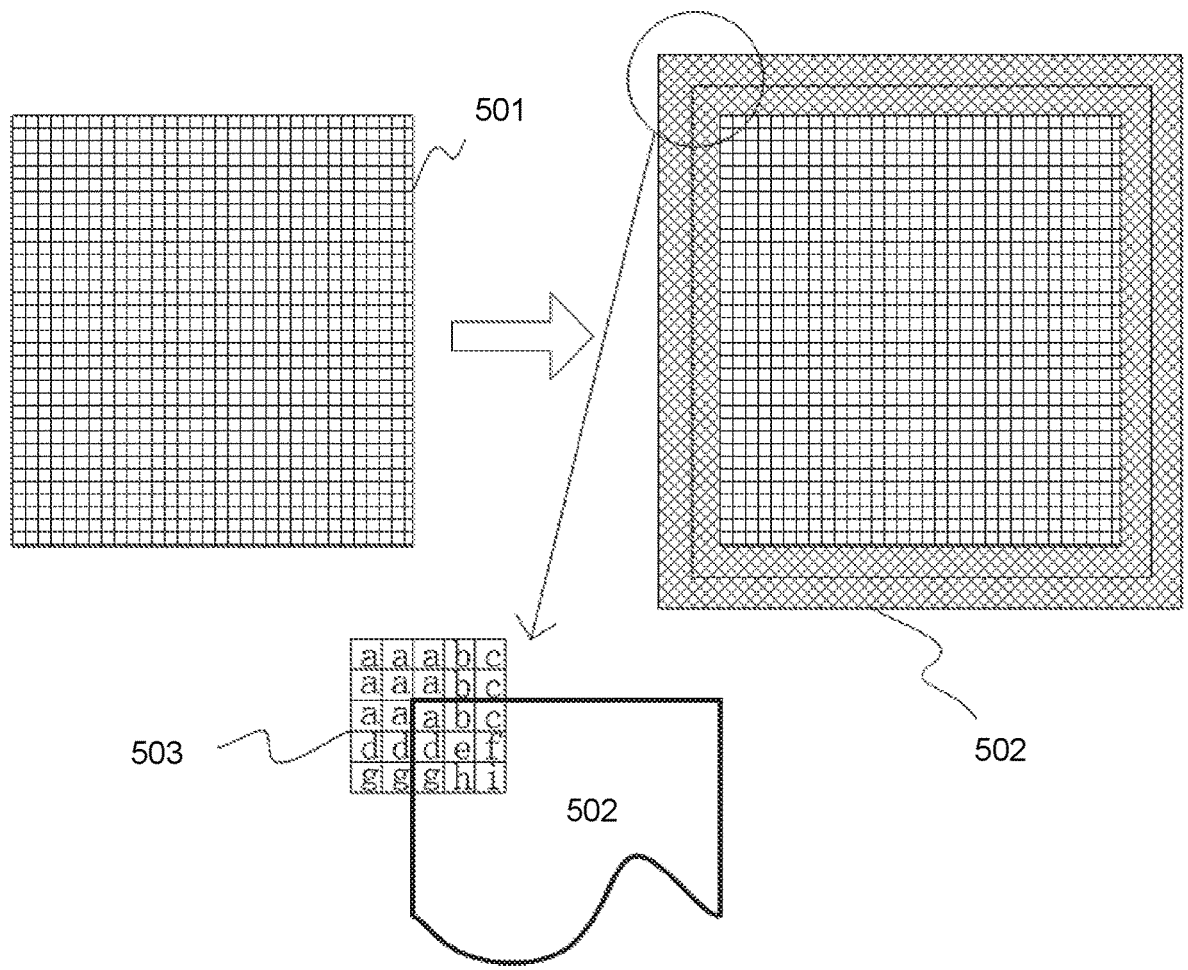
FIG. 5 is a schematic diagram of extending borders of an image and constructing a data processing window according to some embodiments of the present disclosure.

FIG. 5 is a schematic diagram of extending borders of an image and constructing a data processing window according to some embodiments of the present disclosure. Referring to FIG. 5, an image 501 may be an original image before extending borders. Taking a data processing window 503, which has a size of 5×5 as an example, to obtain the filtered value, it may be required to expand the original image 501 by two rows and two columns. In some embodiments, the media server 103 may extend one or more borders of the image by duplicating or mirroring pixels at the one or more borders to generate an extended image. The image 502 may be an image with borders extended. Taking duplicating pixels at the one or more borders of the original image 501 as an example, a schematic diagram for performing a filtering operation on a pixel at the top left corner of the image 502 using the data processing window 503 may be illustrated in FIG. 5.

Figure 6:
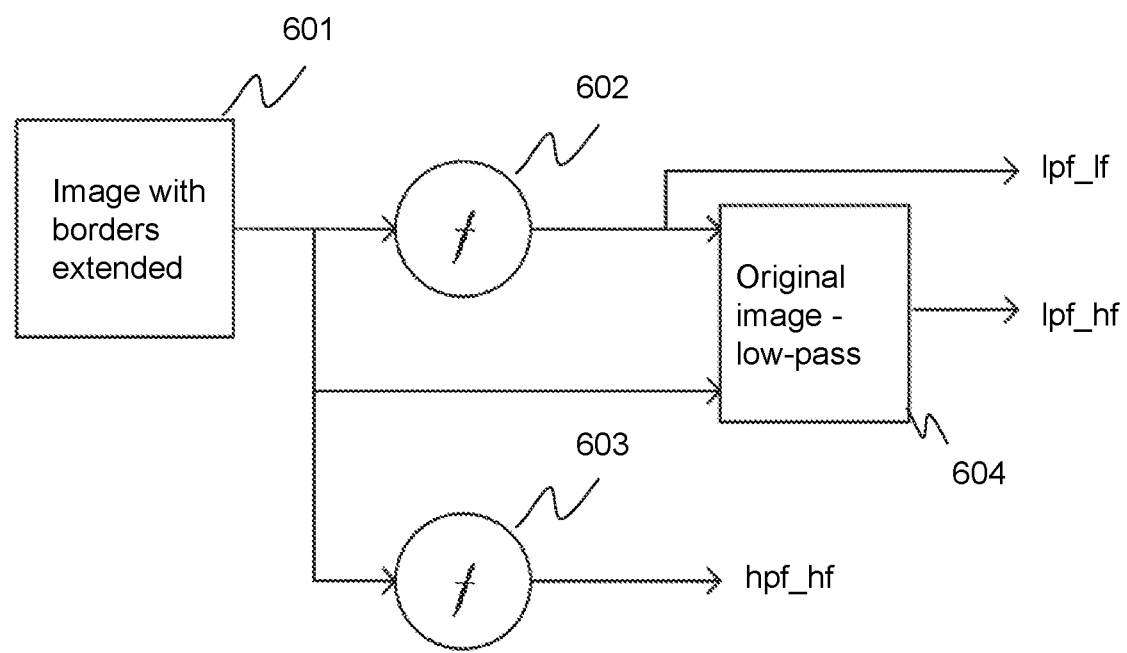
FIG. 6 is a schematic diagram illustrating an exemplary filtering operations according to some embodiments of the present disclosure.

FIG. 6 is a schematic diagram illustrating exemplary filtering operations according to some embodiments of the present disclosure. As illustrated in FIG. 6, the media server 103 may obtain an image 601 with borders extended. The media server 103 may perform a low-pass filtering operation on the image 601 using a first filter 602. In some embodiments, the first filter 602 used in the low-pass filtering operation may have a smoothing effect. For example, the first filter 602 may be a mean filter, or a Gaussian filter. Noise may take a form of a high frequency signal, thus the high frequency noise may be filtered out after a low-pass filtering operation. The media server 103 may obtain and preserve a low-pass result (also referred to as "lpf_lf"). In some embodiments, after the media server 103 filters out the noise, and the media server 103 may further subtract the low-pass result from the original image data, to obtain a first high-pass value (also referred to as "lpf_hf"). The subtraction operation may be performed to all the pixels of the image as a whole, or to every pixel in the image individually. Low-pass filtering operations may determine qualities of small-middle details, since low-pass filtering operations may preserve all the low frequency signals. As used herein, small-middle may refer to a range of sizes from a small size to a middle size. In some embodiments, the imaging processing system 100 or a user may set a small size and/or a middle size. In some embodiments, the media server 103 may perform a high-pass filtering operation on the image 601 using a second filter 603. And the media server 103 may obtain a second high-pass value (also referred to as "hpf_hf"). The second filter 603 used in the high-pass filtering operation may have an edge detection characteristic. For example, the second filter 603 may be first order filter, a second-order filter, or the like. High-pass filtering operations may determine qualities of middle-large details, since high-pass filtering operations may preserve all the high frequency signals. As used herein, middle-large may refer to a range of sizes from a middle size to a large size. In some embodiments, the imaging processing system 100 or a user may set a middle size and/or a large size.

in some embodiments, the media server 103 may perform at least one high pass filtering operation and at least one low-pass filtering operation on each pixel in the input image data to obtain one or more filtered results. For example, the media server 103 may obtain a first high-pass value and a second high-pass value, thus the results of filtering operations may contain characteristics of both a small-middle edge and a middle-large edge, which improves an effect of the image edge enhancement.

More specifically, according to the image edge enhancement method provided by some embodiments of the present disclosure. In 410, the media server 103 may determine an edge value of each pixel according to the results of filtering operations on each pixel in the image by performing one or more operations. The one or more operations may include, for example, determining, according to the first high-pass value of each pixel, an edge type of each pixel, wherein the first high-pass value may be obtained by performing a low-pass filtering operation on each pixel; and determining, according to the edge type and the filtered results of each pixel, the edge value of each pixel.

In some embodiments, the media server 103 may determine the edge type of each pixel by comparing the first high-pass value with one or more thresholds. Since the first high-pass value may preserve characteristics of small-middle edges, and the result obtained by performing a low-pass filtering operation may include more details, the determined edge type may be more accurate.

The media server 103 may distinguish noise, a small-middle edge, and/or a middle-large edge from a strong edge by using of the one or more thresholds, for example, a first threshold, a second threshold and a third threshold. Thus the media server 103 may enhance pixels of different edge types (e.g., by increasing luminance values of the pixels) in varying degrees and suppress noise.

Merely for illustration purposes, the media server 103 may determine the edge type of each pixel in the following manner. For example, the media server 103 may compare the first high-pass value of each pixel in the image with one or more threshold values, such as a first threshold value, a second threshold value, and a third threshold value. If the first high-pass value of a pixel is larger than the first threshold and less than the second threshold, the edge type of the pixel may be a small-middle edge. If the first high-pass value of the pixel is larger than the second threshold and less than the third threshold, the edge type of the pixel may be a middle-large edge. If the first high-pass value of the pixel is larger than the third threshold, the edge type of the pixel may be a strong edge.

In some embodiments, the media server 103 may determine, according to the determined edge type and the filtered results of each pixel, the edge value of each pixel by performing the following operations. The operations may include, for example, determining, for a pixel with an edge type of a small-middle edge, the first high-pass value of the pixel as the edge value of the pixel. The operations may further include determining, for a pixel with an edge type of a middle-large edge or a strong edge, the second high-pass value of the pixel as an edge value.

In addition, if the first high-pass value of a pixel is less than the first threshold, the media server 103 may determine the pixel as noise. The media server 103 may suppress the noise through an edge enhancement coefficient. Each pixel may contain filtered results of both a high-pass filtering and a low-pass filtering. If the edge type of a pixel is determined as a small-middle edge, it may be more accurate to select the first high-pass value as the edge value of the pixel. If the edge type of the pixel is determined as a middle-large edge or a strong edge, it may be more accurate to select the second high-pass value as the edge value of the pixel.

Further, according to the image edge enhancement method provided by some embodiment of the present disclosure, in 410, the media server 103 may determine the edge enhancement coefficient of each pixel based on a first mapping relationship. In some embodiments, the media server 103 may obtain a predetermined first mapping relationship between edge enhancement coefficients and first high-pass values. The media server 103 may determine, according to the first high-pass value of each pixel and the predetermined first mapping relationship, the edge enhancement coefficient of each pixel. In some embodiments, according to the first mapping relationship, the greater the first high-pass value is, the greater the corresponding edge enhancement coefficient may be.

In some embodiments, different edge enhancement coefficients may correspond to different edge types, thus avoiding the incongruity caused by using one edge enhancement coefficient to process the entire image. In some embodiments of the present disclosure, the media server 103 may determine the edge enhancement coefficient using a piecewise function. The piecewise function may include a plurality of pieces, and each piece may correspond to a certain edge type. In some embodiments, each piece may include a transition area. The media server 103 may implement the transition area using an increasing function, such as an exponential function, or a linear function. The transition area may help to generate a better image with edges enhanced.

Figure 7:
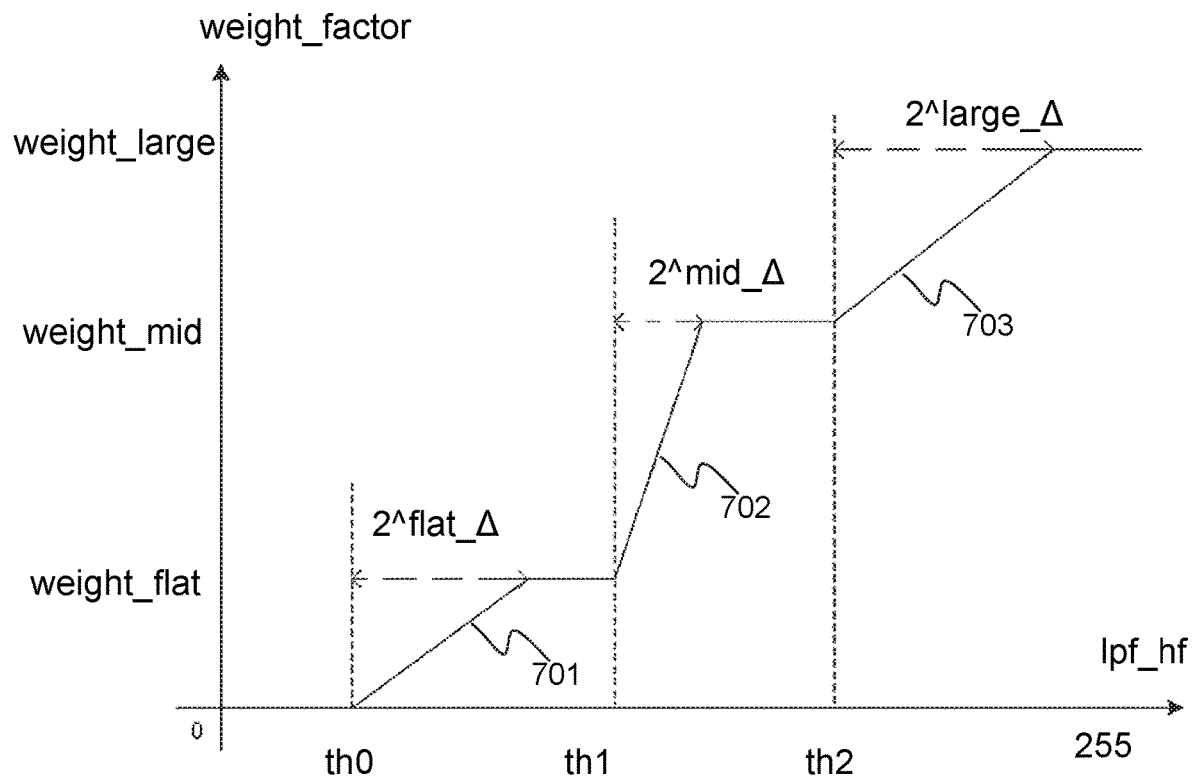
FIG. 7 is a schematic diagram illustrating changes of an edge enhancement coefficient as a function of a filtering processing result according to some embodiments of the present disclosure.

In a particular implementation, the first mapping relationship may be any increasing functions, for example, an increasing piecewise function which may have a plurality of pieces corresponding to one or more edge types. In some embodiments, the first mapping relationship may be determined according to Equation (1):

In order to show Equation (1) more intuitively, FIG. 7 shows a coordinate diagram corresponding to Equation (1). In FIG. 7, transitions 701 through 703 may represent three transition areas, which may be illustrated by linear functions. In a particular implementation, the media server 103 may also use other increasing functions as the transitions.

In some embodiments, according to the image edge enhancement method provided by some embodiments of the present disclosure, step 420 may specifically include one or more sub-steps (not shown in FIG. 4). The one or more sub-steps may include, for example, a first sub-step for determining, based on a luminance value of each pixel, a luminance enhancement adjusting coefficient of each pixel; a second sub-step for determining, based on a motion status of each pixel, a motion enhancement adjusting coefficient of each pixel; and a third sub-step for determining, based on the luminance enhancement adjusting coefficient and the motion enhancement adjustment coefficient of each pixel, an enhancement adjustment coefficient of each pixel.

In particular implementation, the media server 103 may obtain the enhancement adjustment coefficient according to various algorithms or methods, for example, multiplying the luminance enhancement adjusting coefficient by the motion enhancement adjustment coefficient.

In some embodiments, according to the image edge enhancement method provided by some embodiments of the present disclosure, the first sub-step may be performed based on a second mapping relationship. In some embodiments, the media server 103 may obtain a predetermined second mapping relationship between luminance enhancement adjusting coefficients and luminance values. The media server 103 may determine, according to the luminance value of each pixel and the second mapping relationship, a luminance enhancement adjusting coefficient of each pixel. In some embodiments, according to the second mapping relationship, the greater the luminance value is, the greater the corresponding luminance enhancement adjusting coefficient may be.

In some embodiments, different luminance enhancement adjusting coefficients may correspond to different luminance areas, thereby avoiding the incongruity caused by using one luminance enhancement adjusting coefficient to process the entire image. In some embodiments of the present disclosure, the media server 103 may determine the luminance enhancement adjusting coefficient using a piecewise function. The piecewise function may include a plurality of $$\text{weight\_factor} = \begin{cases} 0, & 0 \leq \text{lpf\_hf} \leq th0 \\ (\text{lpf\_hf} - th0) \times (\text{weight\_flat} - 0)/2^{flat\_\Delta} + 0, & th0 < \text{lpf\_hf} < th0 + 2^{flat\_\Delta} \\ \text{weight\_flat}, & th0 + 2^{flat\_\Delta} \leq \text{lpf\_hf} \leq th1 \\ (\text{lpf\_hf} - th1) \times (\text{weight\_mid} - \text{weight\_flat})2^{mid\_\Delta} + \text{weight\_flat}, & th1 < \text{lpf\_hf} < th1 + 2^{mid\_\Delta} \\ \text{weight\_mid}, & th1 + 2^{mid\_\Delta} \leq \text{lpf\_hf} \leq th2 \\ (\text{lpf\_hf} - th2) \times (\text{weight\_high} - \text{weight\_mid}/2^{large\_\Delta} + \text{weight\_mid}, & th2 < \text{lpf\_hf} < th2 + 2^{large\_\Delta} \\ \text{weight\_large}, & th2 + 2^{large\_\Delta} \leq \text{lpf\_hf} \leq 255 \end{cases} \quad (1)$$

where weight_factor may represent an edge enhancement coefficient, lpf_hf may represent a first high-pass value, th0 may represent a first threshold, th1 may represent a second threshold, th2 may represent a third threshold, and weight_flat, weight_mid, weight_large, $2^{flat\_\Delta}$, $2^{mid\_\Delta}$ and $2^{large\_\Delta}$ may be constants.

pieces, and each piece may correspond to a luminance section of a plurality of luminance sections. The plurality of luminance sections may be divided according to a plurality of luminance thresholds. In some embodiments, each piece may include a transition area. The media server 103 may implement the transition area by using an increasing function, such as an exponential function. or a linear function. The transition area may help to generate a better image with edges enhanced.

In a particular implementation, the second mapping relationship may be any increasing functions, for example, a piecewise increasing function. In some embodiments, the second mapping relationship may be determined according to Equation (2):

$$\text{adjust\_factor} = \begin{cases} \text{low\_str}, & 0 \leq Y_{in} \leq \text{low} \\ (Y_{in} - \text{low}) \times (\text{mid\_str} - \text{low\_str}) / 2^{low\_\Delta} + \text{low\_str}, & \text{low} < Y_{in} < \text{low} + 2^{low\_\Delta} \\ \text{mid\_str}, & \text{low} + 2^{low\_\Delta} \leq Y_{in} \leq \text{high} \\ (Y_{in} - \text{high}) \times (\text{high\_str} - \text{mid\_str}) / 2^{high\_\Delta} + \text{mid\_str}, & \text{high} < Y_{in} < \text{high} + 2^{high\_\Delta} \\ \text{high\_str}, & \text{high} + 2^{high\_\Delta} \leq Y_{in} \leq 255 \end{cases} \quad (2)$$

where adjust_factor may represent a luminance enhancement adjusting coefficient, $Y_{in}$ may represent a luminance value, low may represent a first luminance threshold, high may represent a second luminance threshold, and low_str, mid_str, high_str, $2^{low\_\Delta}$ and $2^{high\_\Delta}$ may be constants.

Figure 8:
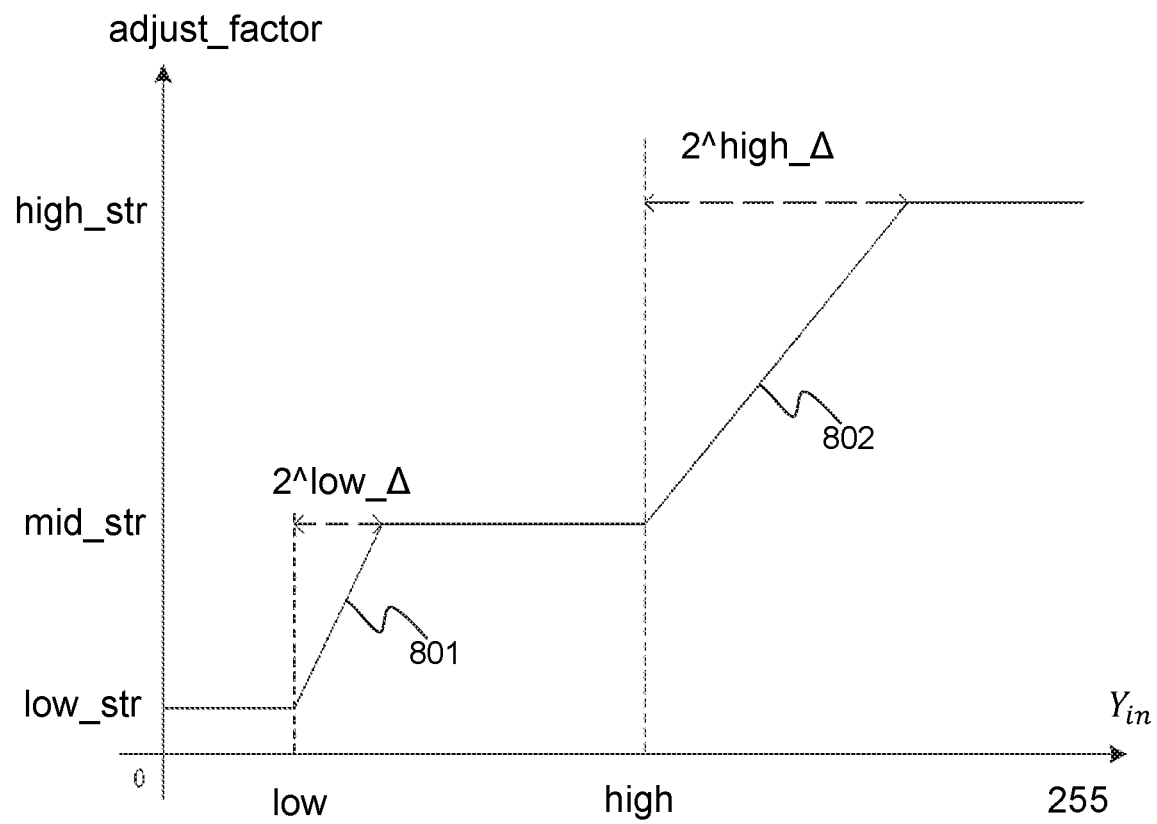
FIG. 8 is a schematic diagram illustrating changes of a luminance enhancement adjusting coefficient as a function of a luminance value according to some embodiments of the present disclosure.

In order to illustrate Equation (2) more intuitively, FIG. 8 shows a coordinate diagram corresponding to Equation (2). In FIG. 8, transitions 801 and 802 may represent two transition areas, which may be illustrated by two linear functions, respectively. In a particular implementation, the media server 103 may use other increasing functions as the transitions.

In some embodiments, the image edge enhancement method may also include adjusting the luminance enhancement adjusting coefficient based on the luminance value and the edge type of each pixel. For instance, if the luminance value is greater than a luminance upper limit or less than a luminance lower limit, the media server 103 may increase the luminance enhancement adjusting coefficient of a pixel with an edge type of a middle-large edge and/or a strong edge, and decrease the luminance enhancement adjusting coefficient of a pixel with an edge type of a small-middle edge. If a luminance value is between a luminance lower limit and a luminance upper limit, the media server 103 may keep the luminance enhancement adjusting coefficient unchanged. In some embodiments, the imaging processing system 100 may obtain the luminance upper limit and/or the luminance lower limit from a terminal, for example, the user device 300. In some embodiments, the imaging processing system 100 may determine the luminance upper limit and/or the luminance lower limit according to default settings.

In some embodiments, distributions of the noise and the edge types may be different in different luminance sections, and a concern level of different types of edges may also be different under different luminance. In consideration of such circumstances, there may be a need to perform certain operations on edges in luminance sections with higher luminance values (also referred to as "high-luminance sections") and luminance sections with lower low luminance values (also referred to as "low-luminance sections"). The media server 103 may perform the certain operations by adjusting the luminance enhancement adjusting coefficient.

Merely for illustration purposes, if the luminance value of a pixel is larger than the luminance upper limit, the pixel may be allocated to the high-luminance section, and if the luminance value of a pixel is less than the luminance lower limit, the pixel may be allocated to the low-luminance section. In some embodiments, in the high-luminance section and the low-luminance section, the media server 103 may enhance middle-large edges and/or strong edges, and suppress small-middle edges, Thereby avoiding enhancing noise when enhancing edges according to luminance values of pixels. In addition, for a section in which luminance values of pixels are between the luminance upper limit and the luminance lower limit, the media server 103 may perform an edge enhancement according to the luminance enhancement adjusting coefficient obtained in the first sub-step. It should be noted that, if the luminance value is between the luminance lower limit and the luminance upper limit, the luminance enhancement adjusting coefficient may keep unchanged. As used herein, "unchanged" may refer that the luminance enhancement adjusting coefficient may not be further processed after being determined by the media server 103 in the first sub-step, rather than being a constant.

Figure 9:
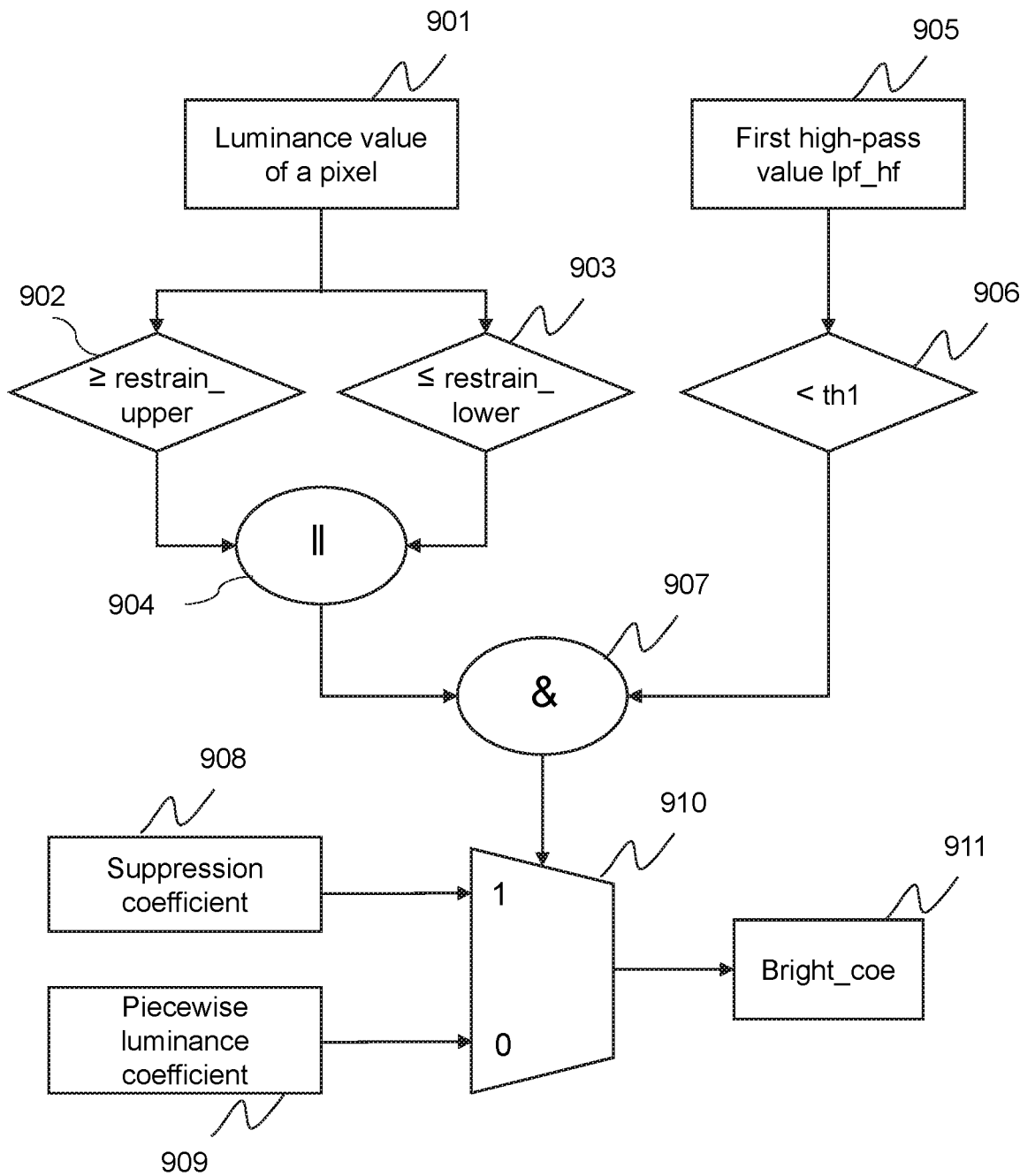
FIG. 9 is a flow chart illustrating an exemplary process of adjusting the luminance enhancement adjusting coefficient according to some embodiments of the present disclosure.

In order to describe the adjustment of the luminance enhancement adjusting coefficient more clearly, FIG. 9 shows a flow diagram of an exemplary process for adjusting the luminance enhancement adjusting coefficient. As shown in FIG. 9, the media server 103 may obtain a luminance value of a pixel in 901. In 902, the processor may determine whether the luminance value is larger than or equal to a luminance upper limit (e.g., a restrain_upper value set by a user). In 903, the media server 103 may determine as to whether the luminance value is less than or equal to a luminance lower limit (e.g., a restrain_lower value set by a user). If the luminance value is larger than the luminance upper limit or less than the luminance lower limit, the media server 103 may adjust a luminance enhancement adjusting coefficient of the pixel in 904. The luminance enhancement adjusting coefficient may be adjusted according to an edge type of the pixel. In 905, the media server 103 may obtain a first high-pass value lpf_hf. In 906, the media server 103 may determine the edge type of the pixel by comparing the first high-pass value with a plurality of thresholds (e.g., a second threshold th1). If the first high-pass value of the pixel is smaller than the second threshold th1, the media server 103 may determine the edge type of the pixel as a small-middle edge or noise. In 907, the processor 222 may adjust the luminance enhancement adjusting coefficient of the pixel according to the edge type of the pixel. The media server 103 may obtain a suppression coefficient and a piecewise luminance coefficient in 908 and 909, respectively. In order to suppress the noise, the media server 103 may decrease the luminance enhancement adjusting coefficient using a suppression coefficient in 910. The pixel with an edge type of a small-middle edge or noise may correspond to a lower luminance enhancement adjusting coefficient. In 911, the media server 103 may determine an adjusted luminance enhancement adjusting coefficient bright_coe. It should be noted that FIG. 9 shows the adjustment of the luminance enhancement adjusting coefficient for a small-middle edge or noise. If the edge type of a pixel is a middle-large edge or a strong edge, the media server 103 may obtain suppression coefficient in 909, and adjust the luminance enhancement adjusting coefficient based on the enhancement coefficient in 910.

Figure 10:
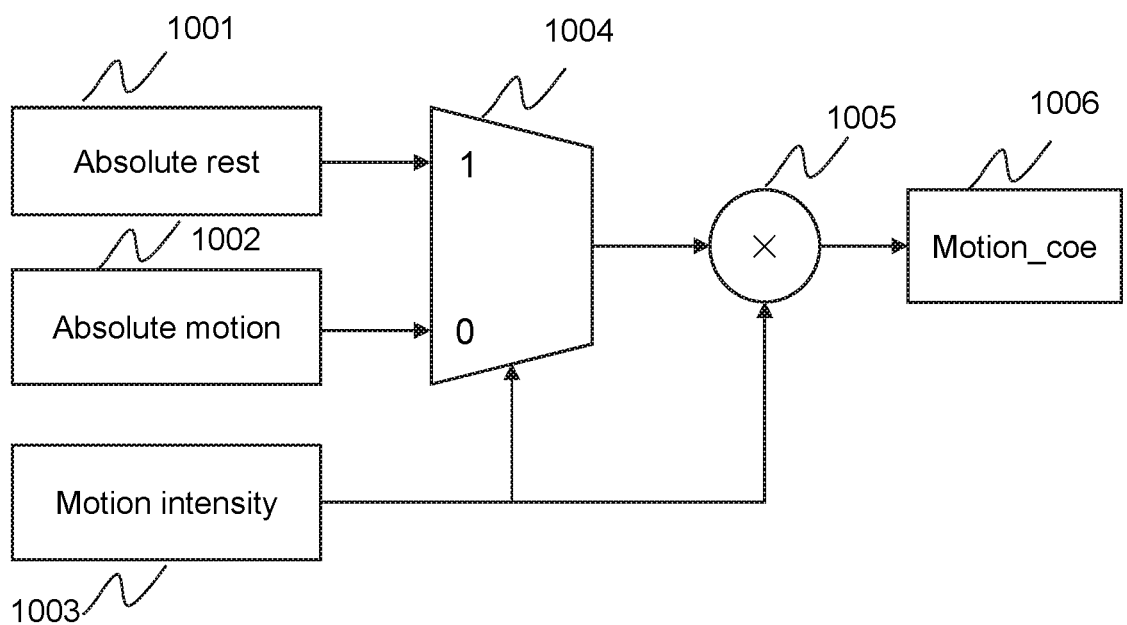
FIG. 10 is a flow chart illustrating an exemplary process of determining a motion enhancement adjusting coefficient according to some embodiments of the present disclosure.

FIG. 10 shows a flow chart of an exemplary process for determining the motion enhancement adjusting coefficient.

In 1004, the media server 103 may obtain a motion intensity value 1003. The media may determine, based on the motion intensity value 1003, a motion status of a pixel (e.g., absolute rest 1001, absolute motion 1002, or a status between absolute rest 1001 and absolute motion 1002). The motion intensity value 1003 of a current pixel may be evaluated based on a plurality of successive images (e.g., a plurality of video frames). For instance, a previous frame may be used as a reference frame. The media server 103 may determine the motion intensity value 1003 based on a difference between the pixel value of the current pixel in a current frame and the pixel value of the current pixel in the reference frame. The media server 103 may also determine the motion intensity value 1003 by using other available methods, which are not limited herein.

In 1005, the media server 103 may determine a third mapping relationship. The third mapping relationship may include values of motion intensity and motion enhancement adjusting coefficients corresponding to the values of motion intensity. In some embodiments, according to the third mapping relationship, the greater the motion intensity value is, the less the motion enhancement adjusting coefficient may be.

In practical applications, the third mapping relationship may be a decreasing function. In some embodiments, the media server 103 may obtain a plurality of thresholds (e.g., a first threshold, and a second threshold, and the second threshold is larger than the first threshold), and determine the third mapping relationship according to the plurality of thresholds. Merely for illustration purposes, if the value of the motion intensity is smaller than a first threshold, the media server 103 may determine the motion status of the pixel as absolute rest, and set the motion enhancement adjusting coefficient as a first value. The first value may be a constant, which may indicate that the media server 103 may not change the edge enhancement coefficient of the pixel. For example, the first value may be 1. When the edge enhancement coefficient is multiplied by the first value, the edge enhancement coefficient may remain the same.

If the value of the motion intensity is larger than a second threshold, the media server 103 may determine the motion status of the pixel as absolute motion, and set the motion enhancement adjusting coefficient as a second value. The second value may be a fixed value, which may indicate that the media server 103 may not enhance the pixel (e.g., increase the luminance value of the pixel). For example, the second value may be 0 or ∞. When an edge enhancement coefficient is multiplied by the second fixed value, the result may be 0, which means the media server 103 may not enhance the pixel.

If the motion intensity value is between the first predetermined threshold and the second predetermined threshold, the media server 103 may determine the motion status of the pixel as being between absolute rest and absolute motion. In some embodiments, the motion enhancement adjusting coefficient may decrease with the increase of the motion intensity value. For example, the media server 103 may set the motion enhancement adjusting coefficient as a certain value (e.g., a variable) between 0 and 1.

It should be noted that the media server 103 may use other methods to determine the third mapping relationship, which may not be limited by the methods set forth above.

A moving pixel generally may have tailings (for example, a movement trail), which may not belong to an edge or noise, thus the media server 103 may not enhance tailings (e.g., by increasing the luminance of the tailings). The motion enhancement adjusting coefficient may help to avoid mistaking a tailing as an edge, which may improve an effect of the edge enhancement. In 1006, the media server 103 may determine the motion enhancement adjusting coefficient motion_coe. The media server 103 may determine the motion enhancement adjusting coefficient of the pixel based on the third mapping relationship and the motion intensity of the pixel.

After the media server 103 determines the luminance enhancement adjusting coefficient, the edge enhancement coefficient and the motion enhancement adjusting coefficient, and selects a corresponding edge value of a pixel, the media server 103 may determine the luminance enhancement result of the pixel (e.g., luminance value of the pixel) according to Equation (3):

$$y\_ee = hf\_data \times (bright\_coe \times weight\_factor \times motion\_coe) + y\_cur, \quad (3)$$

where y_ee may represent the luminance value after edge enhancement; hf_data may represent the edge value of the pixel; bright_coe may represent the luminance enhancement adjusting coefficient; weight_factor may represent the edge enhancement coefficient; motion_coe may represent the motion enhancement adjusting coefficient; and y_cur may represent an original luminance value of the pixel.

After determining the luminance value after edge enhancement, the media server 103 may output the luminance value with the chrominance values U and V (i.e., the edge enhancement result of the pixel) synchronously.

Figure 11:
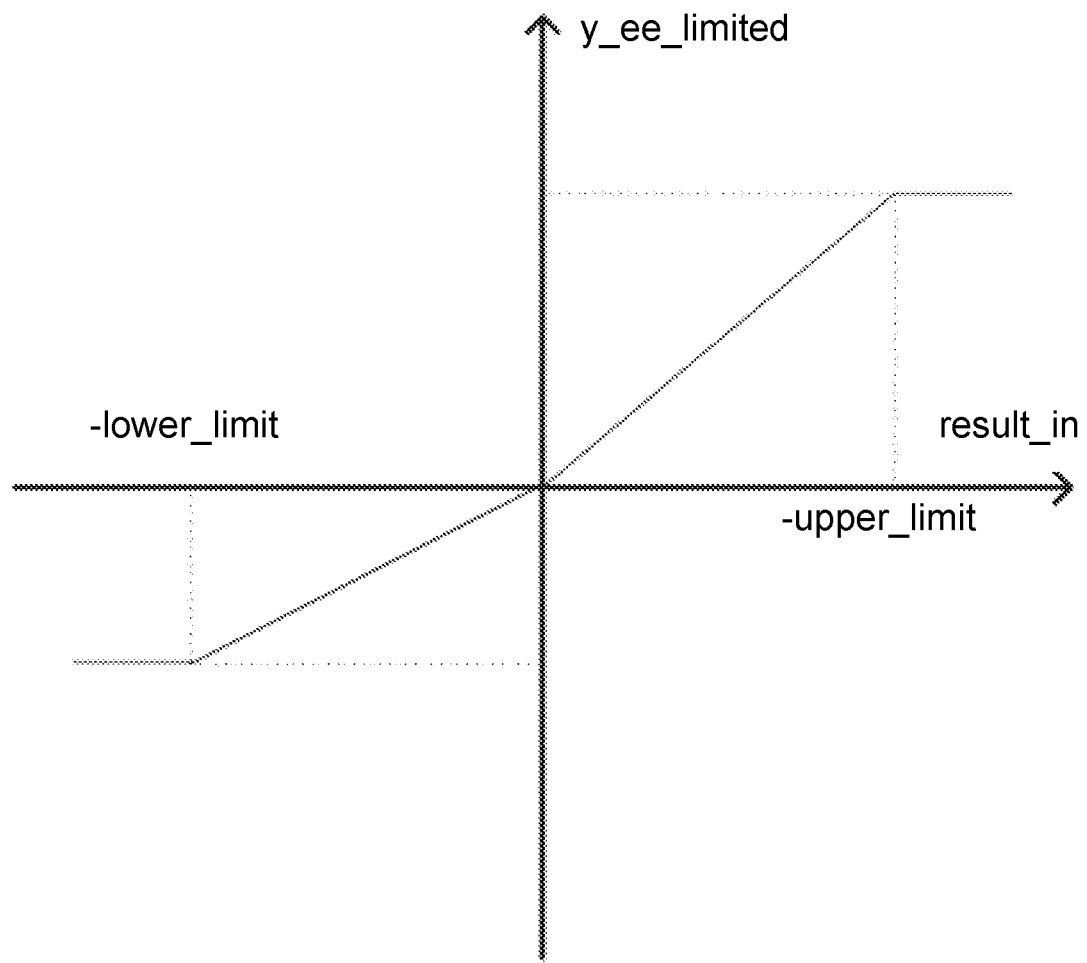
FIG. 11 is a schematic diagram of amplitude limiting according to some embodiments of the present disclosure.

FIG. 11 is a schematic diagram of amplitude limiting according to some embodiments of the present disclosure. Since an edge enhancement result (e.g., a luminance value of a pixel) may not be infinitely great or infinitely small, the media server 103 may limit the edge enhancement result (also referred to as "y_ee" for short) in a certain range to prevent data overflow. As shown in FIG. 11, the media server 103 may obtain a predetermined upper limit value and a predetermined lower limit value. In some embodiments, the media server 103 may designate the predetermined upper limit value as a luminance value of an enhanced pixel, if the luminance value of the enhanced pixel is beyond the upper limit value. In some embodiments, the media server 103 may designate the predetermined lower limit value as a luminance value of an enhanced pixel, if the luminance value of the enhanced pixel is smaller than the lower limit value.

In practical applications, due to amplitude limiting, saturation or other reasons, dead pixels may be present in the edge enhancement result of an image. As used herein, a dead pixel may refer to a pixel in an image that may not display a color or a value properly. In order to guarantee that the output result does not include a dead pixel, the media server 103 may perform a dead pixel correction before outputting the edge enhancement result. For example, after determining the edge enhancement result of each pixel, the media server 103 may perform a dead pixel detection on each pixel to detect dead pixels, and then perform a dead pixel correction on detected dead pixels.

In practical applications, noise in an image obtained in certain scenarios e.g., at night) may be extremely large, and people may pay more attention to middle-large details at night. Therefore, according to the edge enhancement method, the media server 103 may reduce the noise in the image. Specifically, the media server 103 may replace the original luminance value y-cur in Equation (3) with the low-pass result lpf_lf obtained by low-pass filtering. Since the high frequency noise has been filtered out in the low-pass result obtained by low-pass filtering, replacing the luminance value in the original image data with lpf_lf may suppress noise in the original image data.

Figure 12:
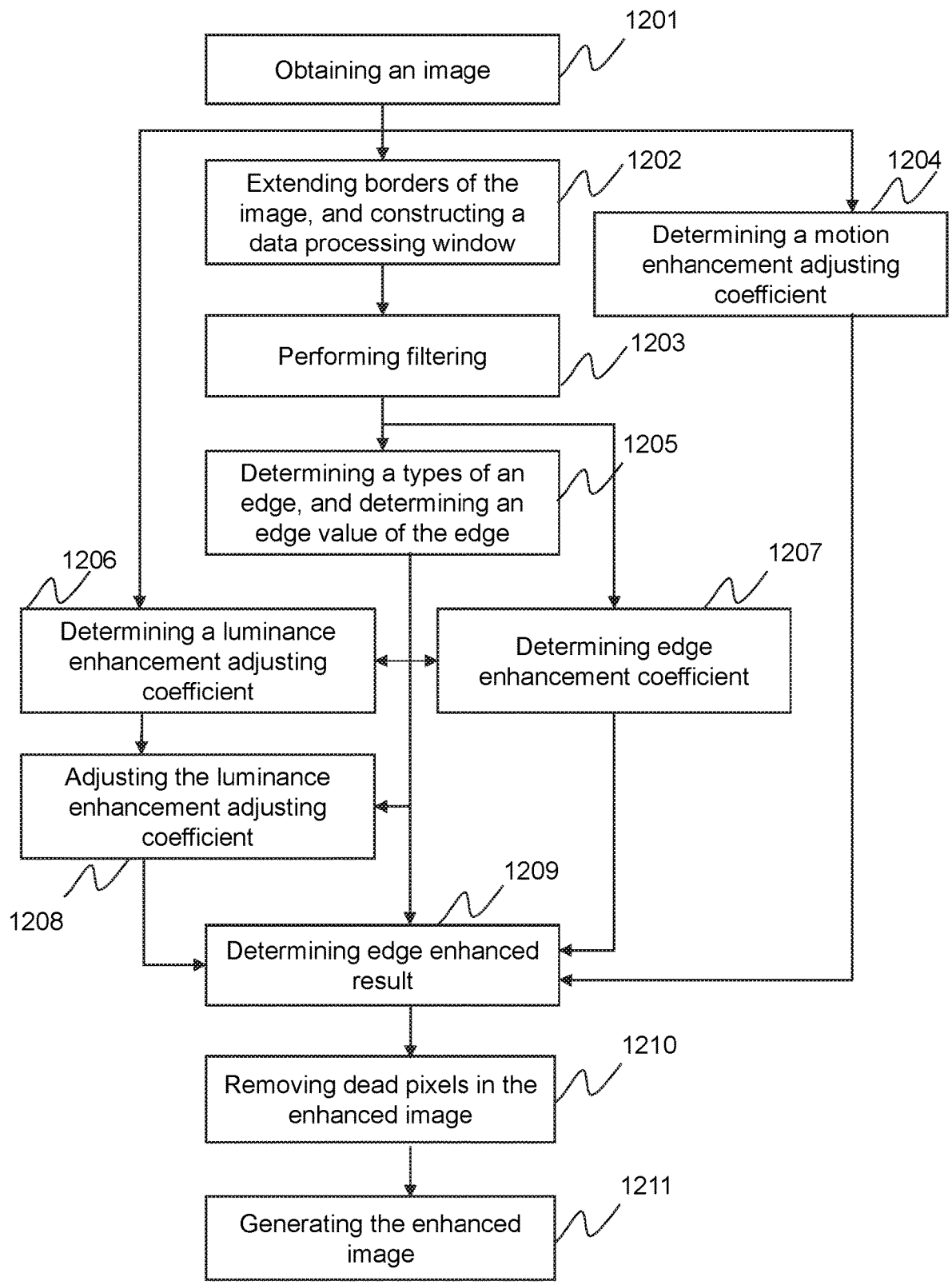
FIG. 12 is a flow chart illustrating an exemplary process of enhancing edges in images according to some embodiments of the present disclosure.

In order to describe the edge enhancement method provided according to some embodiments of the present disclosure more clearly, FIG. 12 shows an entire process for enhancing edges in an image.

In 1201, the media server 103 may obtain an image. The image may include original image data of, for example, a YUV format. The media server 103 may also obtain other associated parameters (such as various thresholds). In some embodiments, the media server 103 may perform processing operations merely on luminance data Y, and synchronously output the chrominance data UV in a bypass.

In 1202, the media server 103 may extend one or more borders of the input image, and construct a data processing window centered at a pixel under processing.

In 1203, the media server 103 may use the data processing window to perform a low-pass filtering and a high-pass filtering. The filter used in the low-pass filtering may have a smoothing characteristic. The media server 103 may perform a low-pass filtering, and obtain a low-pass value. The media server 103 may also use the original image data to subtract the low-pass value to obtain a first high-pass value(. The properties of the filter may determine the quality of middle-large details. The media server 103 may also use the data processing window to perform a high-pass filtering, and obtain a second high-pass value. The filter used in high-pass filtering may have an edge detection characteristic, and the properties of the filter may determine the quality of middle-large details.

In 1204, the media server 103 may use the motion intensity value obtained from historical video frames or in other manners to determine a motion enhancement adjusting coefficient. The motion enhancement adjusting coefficient may play an important role in motion effect adjustment in 1209.

In 1205, the media server 103 may compare the first high-pass value obtained in 1203 with a plurality of thresholds, and obtain an edge type of the pixel. The media server 103 may also determine the edge value corresponding to each edge type. In some embodiments, the image processing system 100 may set three thresholds according to, for example, default settings or user instructions. If the first high-pass value of the pixel is between the first threshold and the second threshold, the pixel may belong to a small-middle edge, and the edge value may be set as the first high-pass value. If the first high-pass value of the pixel is between the second threshold and the third threshold, the pixel may belong to a middle-large edge, and the edge value may be set as the second high-pass value. If the first high-pass value of the pixel is larger than the third threshold, the pixel may belong to a strong edge, and the edge value may be set as the high-pass value.

In 1206, the media server 103 may obtain a luminance value determine whether the luminance value of the pixel belongs to a high-luminance section or a low-luminance section. The media server 103 may determine a luminance enhancement adjusting coefficient of the pixel based on the determination that the luminance value being in a low-luminance section or a high-luminance section.

In 1207, the media server 103 may determine an edge enhancement coefficient based on the edge type of the pixel and one or more parameters (e.g., the first high-pass value, the second high-pass value, etc.).

In 1208, the media server 103 may combine the luminance enhancement adjusting coefficient obtained in 1206 and the edge type obtained in 1205 to adjust the luminance enhancement adjusting coefficient.

In 1209, the media server 103 may combine the adjusted luminance enhancement adjusting coefficient obtained in 1208, the edge enhancement coefficient obtained in 1207, and the motion enhancement adjusting coefficient obtained in 1204 to determine an edge enhancement result (e.g., a luminance value). In some embodiments, the media server 103 may perform one or more operations set forth above (e.g., 1203 through 1209) on each pixel of the obtained image to determine an edge enhancement result for each pixel.

In 1210, the media server 103 may remove possible dead pixels in the edge enhancement results to generate an optimal result.

In 1211, the media server 103 may generate an enhanced image.

Figure 13:
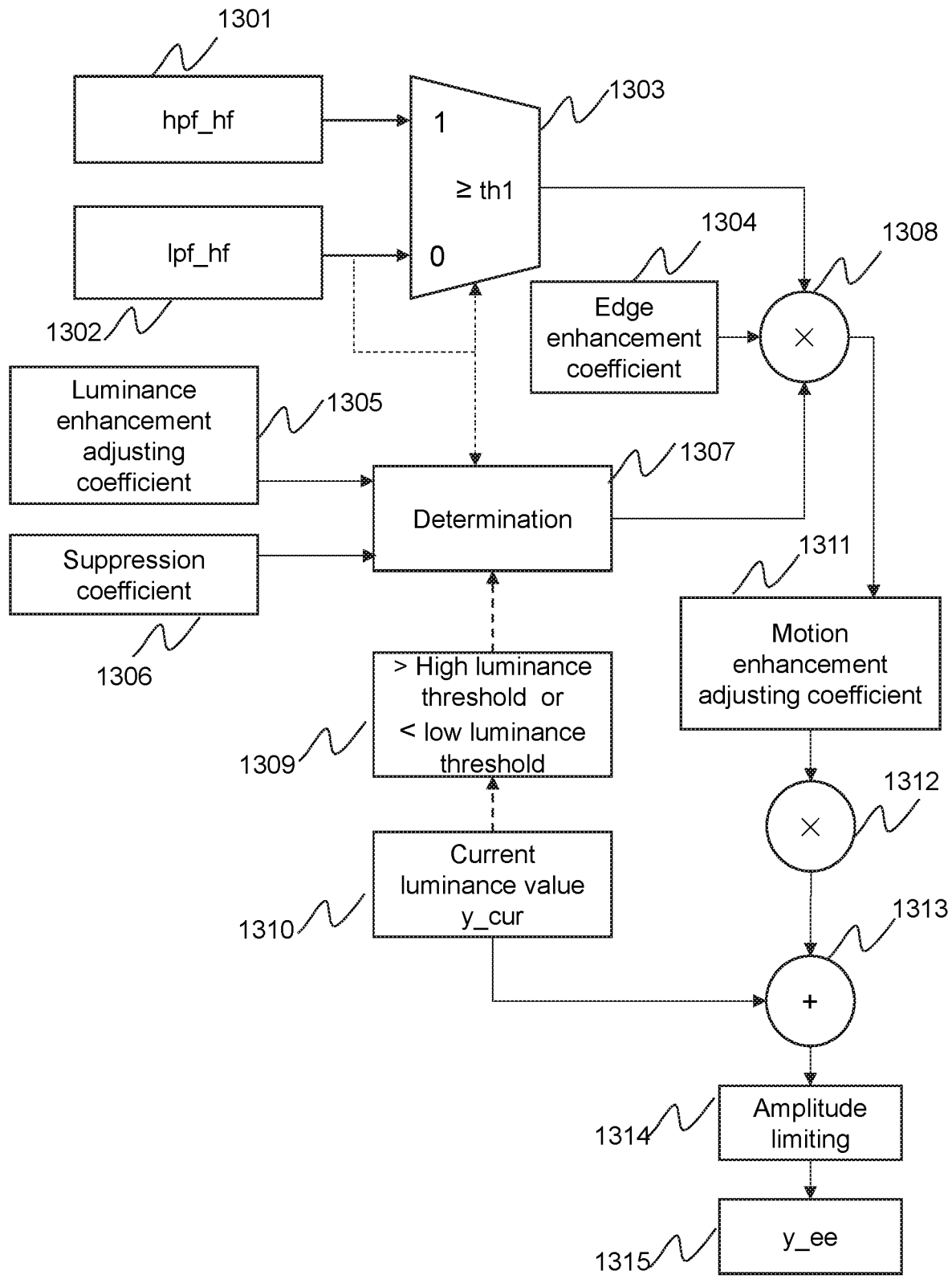
FIG. 13 is a flow chart illustrating an exemplary process of determining an edge enhancement coefficient, a motion enhancement adjusting coefficient and a luminance enhancement adjusting coefficient according to some embodiments of the present disclosure.

After the media server 103 obtains the filtered results in 401, the media server 103 may start a process for determining the edge types, the edge value and the edge enhancement coefficient, which may be illustrated in FIG. 13.

As illustrated in FIG. 13, according to the edge enhancement method provided by some embodiments of the present disclosure, the entire calculation process may only include addition and multiplication calculations without complicated operations, which improves a calculation speed, thereby facilitating real-time processing and saving computational resources.

Figure 14:
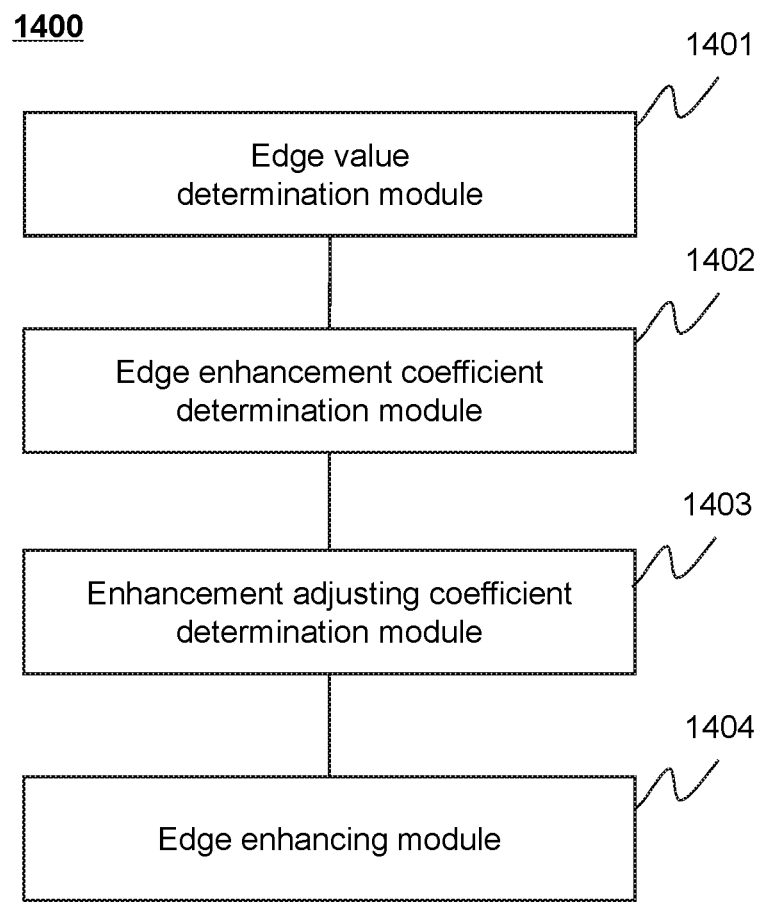
FIG. 14 is a schematic diagram of an exemplary image edge enhancement device according to some embodiments of the present disclosure.

The present disclosure may also provide an image edge enhancement device. FIG. 14 is a schematic diagram of an exemplary image edge enhancement device 1400 according to some embodiments of the present disclosure. The image edge enhancement device 1400 may include an edge value determination module 1401, an edge enhancement coefficient determination module 1402, an enhancement adjusting coefficient determination module 1403, and an edge enhancing module 1404.

The edge value determination module 1401 may determine an edge value of each pixel according to filtered results (e.g., a first high-pass value, a second high-pass value, and/or a low-pass value) of each pixel in an image. The edge enhancement coefficient determination module 1402 may determine an edge enhancement coefficient of each pixel according to the filtered results of each pixel in the image. The enhancement adjusting coefficient determination module 1403 may determine an enhancement adjusting coefficient for adjusting the edge enhancement coefficient of each pixel according to a luminance value and a motion intensity value of each pixel. The edge enhancement module 1404 may enhance the luminance value of each pixel according to the edge value, the edge enhancement coefficient and the enhancement adjusting coefficient of each pixel.

Specifically, in the image edge enhancement device 1400 provided by some embodiments of the present disclosure, the edge value determination module 1401 may further include an edge type determination sub-module, and an edge value determination sub-module (not shown in FIG. 14).

The edge type determination sub-module may determine an edge type of each pixel according to a first high-pass value of each pixel, which may be obtained after a low-pass filtering is performed on each pixel. The edge value determination sub-module may determine the edge value of each pixel according to the edge type and the filtered results of each pixel.

More specifically, in the image edge enhancement device 1400 provided by some embodiments of the present disclosure, the edge type determination sub-module may determine the edge type of a pixel according to one or more thresholds. For example, if the first high-pass value of a pixel is larger than a first threshold and less than a second threshold, the edge type of the pixel may be determined as a small-middle edge. If the first high-pass value of the pixel is larger than the second threshold and less than a third threshold, the edge type of the pixel may be determined as a middle-large edge. If the first high-pass value of the pixel is larger than the third threshold, the edge type of the pixel may be determined as a strong edge.

More specifically, in the image edge enhancement device 1400 provided by some embodiments of the present disclosure, the edge value determination sub-module may determine, for a pixel with an edge type of a small-middle edge, the first high-pass value of the pixel as the edge value of the pixel. The edge value determination sub-module may also determine, for a pixel with an edge type of a middle-large edge or a strong edge, the second high-pass value of the pixel as the edge value of the pixel, which may be obtained after the image edge enhancement device 1400 performs a high-pass filtering each pixel.

More specifically, in the image edge enhancement device 1400 provided by some embodiments of the present disclosure, the edge enhancement coefficient determination module 1402 may determine the edge enhancement coefficient of each pixel according to the first high-pass value of each pixel and a first predetermined mapping relationship between edge enhancement coefficients and first high-pass values. In some embodiments, according to the first mapping relationship, the greater a first high-pass value is, the greater a corresponding edge enhancement coefficient may be.

Further, in the image edge enhancement device 1400 provided according to some embodiments of the present disclosure, the enhancement adjusting coefficient 1403 may further include a luminance enhancement adjusting coefficient determination sub-module, a motion enhancement adjusting coefficient determination sub-module, and an enhancement adjusting coefficient determination sub-module (not shown in FIG. 14). The luminance enhancement adjusting coefficient determination module may be configured to determine a luminance enhancement adjusting coefficient of each pixel according to the luminance value of each pixel.

The motion enhancement adjusting coefficient determination sub-module may be configured to determine a motion enhancement adjusting coefficient of each pixel according to a motion status (e.g., absolute rest, absolute motion, or a motion status between absolute rest and absolute motion) of each pixel. The enhancement adjusting coefficient determination sub-module may be configured to determine an enhancement adjusting coefficient of each pixel according to the luminance enhancement adjusting coefficient and the motion enhancement adjusting coefficient of each pixel.

In some embodiments, the luminance enhancement adjusting coefficient determination module may determine the luminance enhancement adjusting coefficient of each pixel according to the luminance value of each pixel and a second mapping relationship between luminance enhancement adjusting coefficients and luminance values. In some embodiments, according to the second mapping relationship, the greater a luminance value is, the greater a corresponding luminance enhancement adjusting coefficient may be.

In some embodiments, the image edge enhancement device 1400 provided by the embodiment of the present disclosure may further include a luminance enhancement adjusting coefficient adjustment module (not shown in FIG. 14). The luminance enhancement adjusting coefficient adjustment module may be configured to adjust the luminance enhancement adjusting coefficient according to the luminance value and the edge type of each pixel. In some embodiments, if the luminance value is larger than a luminance upper limit or smaller than a luminance lower limit, the luminance enhancement adjusting coefficient of a pixel with an edge type of a middle-large edge and/or a strong edge may be increased, and the luminance enhancement adjusting coefficient of a pixel with an edge type of a small-middle edge may be decreased. If the luminance value is between the luminance lower limit and the luminance upper limit, the luminance enhancement adjusting coefficient may remain unchanged.

Specifically, in the image edge enhancement device 1400 provided by some embodiments of the present disclosure, the motion enhancement adjusting coefficient determination sub-module may determine the motion enhancement adjusting coefficient of each pixel according to the motion intensity value of each pixel and a third mapping relationship between motion enhancement adjusting coefficients and motion intensity values. In some embodiments, according to the third mapping relationship, the greater a motion intensity value is, the less a motion enhancement adjusting coefficient may be.

The image edge enhancement device 1400, provided by some embodiments of the present disclosure, may also include an amplitude limiting module (not shown in FIG. 14). The amplitude limiting module may be configured to determine, for a pixel with a luminance value being larger than a predetermined upper limit value, the predetermined upper limit value as the luminance value of the pixel. The amplitude limiting module may also determine, a pixel with a luminance value being smaller than a predetermined lower limit value, the predetermined lower limit value as a luminance value of the pixel.

The image edge enhancement device 1400, provided according to some embodiments of the present disclosure, may also include a dead pixel correction module (not shown in FIG. 14). The dead pixel correction module may be configured to perform dead pixel detection on each pixel, and perform a dead pixel correction on a pixel which is determined as a dead pixel.

An image edge enhancement method may be implemented on the device shown in FIG. 14 may include determining an edge type of each pixel according to filtered results of each pixel, and determining an edge enhancement coefficient of each pixel according to the edge type of each pixel. The method may combine a luminance enhancement coefficient and an motion enhancement adjusting coefficient when determining the edge enhancement result (e.g., a luminance value) of each pixel. Such combination may enable the image edge enhancement device 1400 to enhance pixels of different edge types with different degrees, and a plurality of factors that may influence edge enhancement effects may be considered, thereby improving the edge enhancement effect.

In a filtering processing, a filter having a smoothing characteristic may be used to obtain small-middle edges and noise, and a filter having an edge filtering characteristic may be used to obtain middle-large edges and strong edges, thereby precisely determining an edge type of each pixel and noise. In determining the edge type, a plurality of thresholds may be used to divide the filtered results into one or more sections to precisely distinguish noise, small-middle edges, middle-large edges and strong edges from each other. The image edge enhancement device 1400 may determine different edge enhancement coefficients according to different edge types, and may include a transition area, which may avoid possible incongruity resulted from a uniform edge enhancement (e.g., using one edge enhancement coefficient to process all pixels of an image). In some embodiments, the image edge enhancement device 1400 may also use a plurality of thresholds to perform section division on luminance values of the image. The image edge enhancement device 1400 may determine, according to characteristics of edge types and noise corresponding to different luminance values, different enhancement intensities or suppression intensities to enhance the image. In some embodiments, the image edge enhancement device 1400 may process motion information of each pixels in the image, determine a motion status of each pixel based on the motion information, and determine the enhancement intensity for each pixel according to the motion status, which may avoid enhancing trailing resulted from a uniform edge enhancement. The image edge enhancement device 1400 may perform a dead pixel correction process, which may guarantee that the edge enhancement result does not include a dead pixel. The entire process for enhancing edges in images may merely include addition and multiplication calculations rather than complicated operations, thereby facilitating real time processing for hardware of the image edge enhancement device with a relatively high operation speed, and saving computational resource.

It will be apparent to those skilled in the art that various changes and modifications can be made in the present disclosure without departing from the spirit and scope of the disclosure. The present disclosure may be intended to include such modifications and variations if the modifications and variations of the present disclosure are within the scope of the claims and the equivalents thereof.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

We claim:

1. An image processing system configured to enhance edges in images, comprising an image processing unit including:
    a bus;
    at least one storage medium connected to the bus, including a set of instructions for image edge enhancement;
    logic circuits in communication with the at least one storage medium via the bus, wherein when executing the set of instructions, the logic circuits:
        obtain first electronic signals including image data of an image, wherein the image includes a plurality of pixels, and each of the plurality of pixels has a luminance value and a motion intensity value;
        duplicate or mirror pixels at one or more borders of the image;
        perform at least one filtering operation to the image to obtain one or more filtered values for each pixel, wherein to perform the at least one filtering operation, the logic circuits:
            filter image data of the image using a low-pass filter to generate a low-pass value for each pixel of the image;
            for each pixel of the image, subtract the low-pass value from the image data to generate a first high-pass value; and
            filter the image data of the image using a high-pass filter to generate a second high-pass value for each pixel of the image;
        perform a first logical operation to the one or more filtered values of each pixel in the image to obtain an edge value and an edge enhancement coefficient for each pixel in the image;
        perform a second logical operation to the luminance value and the motion value of each pixel to obtain an enhancement adjusting coefficient for each pixel in the image, wherein the enhancement adjusting coefficient is associated with the edge enhancement coefficient; and
        adjust the luminance value of each pixel based on the edge value, the edge enhancement coefficient, and the enhancement adjusting coefficient of each pixel.

2. The system of claim 1, further comprising:
    at least one lens configured to intake a scene; and
    at least one sensor in communication with the logic circuits, configured to detect the scene from the at least one lens and transform the scene into the first electronic signal.

3. The system of claim 1, wherein the motion intensity value is a degree of a change of a pixel caused by motion, and the logic circuits further determine a motion status of the pixel based on the motion intensity value.

4. The system of claim 1, wherein to perform the first logical operation to determine the edge value for each pixel in the image, the logic circuits:
    compare the first high-pass value of a pixel with at least one of a first threshold, a second threshold, or a third threshold,
    in response to a determination that the first high-pass value is larger than the first threshold and smaller than the second threshold, assign the first high-pass value to the edge value of the pixel; and
    in response to the determination that the first high-pass value is larger than the second threshold value, assign the second high-pass value to the edge value of the pixel.

5. The system of claim 1, wherein to perform the first logical operation to obtain the edge enhancement coefficient for each pixel in the image, the logic circuits:
    obtain second electronic signals including a first mapping relationship between edge enhancement coefficients and the first high-pass values; and
    determine the edge enhancement coefficient for each pixel based on the first high-pass value for each pixel and the first mapping relationship.

6. The system of claim 1, wherein to perform the second logical operation to obtain the enhancement adjusting coefficient for each pixel in the image, the logic circuits:
    determine a luminance enhancement adjusting coefficient for each pixel based on the luminance value of each pixel;
    determine a motion enhancement adjusting coefficient for each pixel based on the motion status of each pixel; and
    determine the enhancement adjusting coefficient for each pixel based on the luminance enhancement adjusting coefficient and motion enhancement adjusting coefficient for each pixel.

7. The system of claim 6, wherein to determine the luminance enhancement adjusting coefficient for each pixel based on the luminance value of each pixel, the logic circuits:
    obtain third electronic signals including a second mapping relationship between luminance enhancement adjusting coefficients and luminance values; and
    determine the luminance enhancement adjusting coefficient for each pixel based on the luminance value of each pixel and the second mapping relationship.

8. The system of claim 6, wherein to determine the motion enhancement adjusting coefficient for each pixel based on the motion status of each pixel, the logic circuits:
    obtain fourth electronic signals including a third mapping relationship between motion enhancement adjusting coefficients and motion statuses; and
    determine the motion enhancement adjusting coefficient for each pixel based on the motion status of each pixel and the third mapping relationship.

9. The system of claim 1, wherein the logic circuits further:
    compare a first high-pass value of a pixel with at least one of a first threshold, a second threshold, or a third threshold,
    adjust the luminance enhancement adjusting coefficient for each pixel based on the luminance value and a comparison result of each pixel.

10. A method configured to be implemented on at least one image processing device to enhance edges in images, comprising:
    obtaining, by the at least one imaging processing device, image data of an image, wherein the image includes a plurality of pixels, and each of the plurality of pixels has a luminance value and a motion intensity value;

duplicating or mirroring pixels at one or more borders of the image;

performing at least one filtering operation to the image to obtain, by the at least one imaging processing device, one or more filtered values for each pixel, wherein performing the at least one filtering operation includes:
  filtering image data of the image using a low-pass filter to generate a low-pass value for each pixel of the image;
  for each pixel of the image, subtracting the low-pass value from the image data to generate a first high-pass value; and
  filtering the image data of the image using a high-pass filter to generate a second high-pass value for each pixel of the image;

performing a first logical operation to the one or more filtered values of each pixel in the image to obtain, by the at least one imaging processing device, an edge value and an edge enhancement coefficient for each pixel in the image;

performing a second logical operation to the luminance value and the motion value of each pixel to obtain, by the at least one imaging processing device, an enhancement adjusting coefficient for each pixel in the image, wherein the enhancement adjusting coefficient is associated with the edge enhancement coefficient; and adjusting, by the at least one imaging processing device, the luminance value of each pixel based on at least one of the type, the edge enhancement coefficient, and the enhancement adjusting coefficient of each pixel.

11. The method of claim 10, wherein the motion intensity value is a degree of a change of a pixel caused by motion, and the logic circuits further determine a motion status of the pixel based on the motion intensity value.

12. The method of claim 10, wherein to perform the first logical operation to obtain the edge enhancement coefficient for each pixel in the image, the method further comprises:
  obtaining second electronic signals including a first mapping relationship between edge enhancement coefficients and the first high-pass values; and
  determining the edge enhancement coefficient for each pixel based on the first high-pass value for each pixel and the first mapping relationship.

13. The method of claim 10, wherein to perform the second logical operation to obtain the enhancement adjusting coefficient for each pixel in the image, the method further comprises:
  determining a luminance enhancement adjusting coefficient for each pixel based on the luminance value of each pixel;
  determining a motion enhancement adjusting coefficient for each pixel based on the motion status of each pixel; and
  determining the enhancement adjusting coefficient for each pixel based on the luminance enhancement adjusting coefficient and motion enhancement adjusting coefficient for each pixel.

14. The method of claim 13, wherein to determine the luminance enhancement adjusting coefficient for each pixel based on the luminance value of each pixel, the method further comprises:
  obtaining third electronic signals including a second mapping relationship between luminance enhancement adjusting coefficients and luminance values; and
  determining the luminance enhancement adjusting coefficient for each pixel based on the luminance value of each pixel and the second mapping relationship.

15. The method of claim 13, wherein to determine the motion enhancement adjusting coefficient for each pixel based on the motion status of each pixel, the method further comprises:
  obtaining fourth electronic signals including a third mapping relationship between motion enhancement adjusting coefficients and motion statuses; and
  determining the motion enhancement adjusting coefficient for each pixel based on the motion status of each pixel and the third mapping relationship.

16. A non-transitory medium storing instructions, the instructions, when executed by at least one image processing device, causing the at least one image processing device to implement a method, comprising:
  obtaining, by the at least one imaging processing device, image data of an image, wherein the image includes a plurality of pixels, and each of the plurality of pixels has a luminance value and a motion intensity value;
  duplicating or mirroring pixels at one or more borders of the image;
  performing at least one filtering operation to the image to obtain, by the at least one imaging processing device, one or more filtered values for each pixel, wherein performing the at least one filtering operation includes:
    filtering image data of the image using a low-pass filter to generate a low-pass value for each pixel of the image;
    for each pixel of the image, subtracting the low-pass value from the image data to generate a first high-pass value; and
    filtering the image data of the image using a high-pass filter to generate a second high-pass value for each pixel of the image;
  performing a first logical operation to the one or more filtered values of each pixel in the image to obtain, by the at least one imaging processing device, an edge value and an edge enhancement coefficient for each pixel in the image;
  performing a second logical operation to the luminance value and the motion value of each pixel to obtain, by the at least one imaging processing device, an enhancement adjusting coefficient for each pixel in the image, wherein the enhancement adjusting coefficient is associated with the edge enhancement coefficient; and
  adjusting, by the at least one imaging processing device, the luminance value of each pixel based on at least one of the type, the edge enhancement coefficient, and the enhancement adjusting coefficient of each pixel.

* * * * *